United States Patent
Yoshimoto et al.

(10) Patent No.: US 8,644,424 B2
(45) Date of Patent: Feb. 4, 2014

(54) RECEIVER APPARATUS, COMMUNICATION SYSTEM, RECEPTION METHOD AND COMMUNICATION METHOD

(75) Inventors: Takashi Yoshimoto, Osaka (JP); Minoru Kubota, Osaka (JP); Naoki Okamoto, Osaka (JP); Hiroshi Suzuki, Tokyo (JP); Kazuhiko Fukawa, Tokyo (JP); Satoshi Suyama, Fujisawa (JP)

(73) Assignees: Sharp Kabushiki Kaisha, Osaka (JP); Hiroshi Suzuki, Tokyo (JP); Kazuhiko Fukawa, Tokyo (JP); Satoshi Suyama, Kanagawa (JP)

( * ) Notice: Subject to any disclaimer, the term of this patent is extended or adjusted under 35 U.S.C. 154(b) by 252 days.

(21) Appl. No.: 13/201,234

(22) PCT Filed: Feb. 12, 2010

(86) PCT No.: PCT/JP2010/052071
§ 371 (c)(1),
(2), (4) Date: Aug. 12, 2011

(87) PCT Pub. No.: WO2010/093012
PCT Pub. Date: Aug. 19, 2010

(65) Prior Publication Data
US 2011/0292984 A1    Dec. 1, 2011

(30) Foreign Application Priority Data
Feb. 13, 2009    (JP) .................. 2009-030866

(51) Int. Cl.
*H03D 3/00* (2006.01)
(52) U.S. Cl.
USPC .......................................... 375/322; 375/332
(58) Field of Classification Search
USPC .................. 375/322, 316, 329, 331, 332
See application file for complete search history.

(56) References Cited

U.S. PATENT DOCUMENTS
2004/0196114 A1* 10/2004 Aiga et al. ............... 333/99 S FOREIGN PATENT DOCUMENTS
JP    2000-101358 A    4/2000
JP    2005-318381 A    11/2005
JP    2009-88991 A     4/2009

OTHER PUBLICATIONS

Machine generated translation of previously cited foreign reference JP 2000-101358 A, in International Search Report of Apr. 2011. Submitted on Aug. 12, 2011.
Machine generated translation of previously submitted foreign reference JP 2009-88991, in International Search Report of Apr. 2011. Submitted on Aug. 12, 2011.
Machine generated translation of previously submitted foreign reference JP 2005-318381 A, in International Search Report of Apr. 2011. Submitted on Aug. 12, 2011.
Wenjun Sheng et al. "CMOS RF Receiver System Designing: A Systematice Approach," IEEE Trans. Circuits Syst. I, vol. 53, No. 5, May 2006.

* cited by examiner

*Primary Examiner* — Emmanuel Bayard
(74) *Attorney, Agent, or Firm* — Birch, Stewart, Kolasch & Birch, LLP

(57) ABSTRACT

A receiver apparatus receiving a quadrature-modulated, modulated wave, includes: a real-zero signal generator for adding a sinusoidal wave to the modulated wave to generate a real-zero signal; an in-phase and quadrature component detector for extracting an in-phase component signal and a quadrature component signal from the real-zero signal; a real-zero sequence generator for generating a real-zero sequence as a sequence of time points at which the in-phase component and quadrature component signals become zero; and a signal reconstruction unit for reproducing the in-phase component and quadrature component from the real-zero sequence. It is possible to provide a receiving apparatus that enables decoding of a received signal with high precision even when sufficient linearity cannot be secured in the analog circuit of the receiver apparatus.

11 Claims, 22 Drawing Sheets

RECEIVER APPARATUS, COMMUNICATION SYSTEM, RECEPTION METHOD AND COMMUNICATION METHOD

TECHNICAL FIELD

The present invention relates to a receiver apparatus, communication system, reception method and communication method that receive quadrature-modulated modulated waves.

BACKGROUND ART

In radio communication systems for mobile telephones and the like, communication is performed by using signals that are obtained by quadrature-modulating (IQ modulating) channel-coded, coded bits, using PSK (Phase Shift Keying), QAM (Quadrature Amplitude Modulation), etc.

FIG. 25 is one example of a receiver apparatus that receives a quadrature-modulated signal in single-carrier transmission. A receiver apparatus 900 includes a low-noise amplifier 902 (LNA: Low Noise Amplifier), a frequency converter 903, a filter unit 904, a gain control amplifier 905, an IQ detector 906, an AD converter 907, a demodulator 908 and a decoder 909, and is connected to an antenna unit 901.

In receiver apparatus 900, the quadrature-modulated signal received via antenna unit 901 is amplified by low-noise amplifier 902, then down-converted by frequency converter 903 to an IQ-detectable frequency band. The output signal from the frequency converter 903, from which higher harmonics and the out-of-band components of the signal are removed by filter unit 904, and then is adjusted as to amplitude so that the signal will not be clipped by IQ detector 906 and AD converter 907.

In IQ detector 906, the in-phase component (real number component) and quadrature component (imaginary number component) are extracted from the output signal of gain control amplifier 905. In AD converter 907, the signals of the in-phase component and quadrature component are each converted from an analog signal to a digital signal. In demodulator 908, the digital signals of the in-phase component and quadrature component output from AD converter 907 are demapped so as to calculate coded bits. Finally, a decoding process of the coded bits is performed by decoder 909.

In the above receiver apparatus 900, low-noise amplifier 902, frequency converter 903, filter unit 904, gain control amplifier 905 and IQ detector 906 are formed of analog circuitry while demodulator 908 and decoder 909 are formed of digital circuitry, and AD converter 907 performs conversion.

In the analog circuit of the above receiver apparatus 900, in order to decode data with high precision, it is necessary to keep linearity when the processes from amplication of the quadrature-modulated wave, extraction of in-phase and quadrature components and input to the demapping process are performed. In other words, in order to reproduce the signal waveform with as less deformation as possible, an analog circuit having a wide dynamic range in which good linearity is maintained up to input to AD converter 907 is needed. Further, AD converter 907 needs to have a voltage resolution that satisfies the quantization error absorbable by the digital process. It is necessary for gain control amplifier 905 to perform highly accurate gain control over a wide range so that the signal will not be clipped by the AD converter 907

On the other hand, in radio communication systems such as mobile telephones etc., it is preferable that the receiver apparatus is compact and low in power consumption, so that there are integrated ICs in which the analog circuit and digital circuit that form the receiver apparatus are integrated (see non-patent document 1, for example). It is possible in the integrated IC to achieve reduction in IC chip size and high-speed operation with low voltage thanks to miniaturization of devices, hence it is possible to make the receiver apparatus compact and low in power consumption. Non-patent document 1 presents an IC design example where analog circuits and digital circuits for the portions having the corresponding functions are integrated though the order of arrangement of individual functional components is different from that of the receiver apparatus 900.

PRIOR ART DOCUMENT

Non-Patent Document

Non-Patent Document 1: Wenjun Sheng, Ahmed Emira, and Edgar Sanchez-Sinencio, "CMOS RF Receiver System Designing: A Systematic Approach," IEEE Trans. Circuits Syst. I, Vol. 53, No. 5, MAY 2006.

SUMMARY OF INVENTION

Problems to be Solved by the Invention

However, in the analog circuit of the integrated IC, the variance of elements increases with miniaturization, and also SNR lowers with the lowering of the power supply voltage, presenting low gain. As a result, the analog circuit of the receiver apparatus entails the problem that the operational range in which sufficient linearity can be secured becomes narrow, causing signal waveform deformation and degrading decoding accuracy of the received signal. Further, the AD conversion also has the problem that it is difficult to improve quantization accuracy by improving voltage resolution, due to lowering of the power supply voltage.

The present invention has been devised in view of the above problems, it is therefore an object of the present invention to provide a receiver apparatus or the like that enables decoding of a received signal with high precision even if sufficient linearly cannot be assured in the analog circuit in the receiver apparatus.

Means for Solving the Problems

In view of the above problem, a receiving apparatus of the present invention is a receiver apparatus receiving a quadrature-modulated, modulated wave, comprising: a real-zero signal generator for adding a sinusoidal wave to the modulated wave to generate a real-zero signal; an in-phase and quadrature component detector for extracting an in-phase component signal and a quadrature component signal from the real-zero signal; a real-zero sequence generator for generating a real-zero sequence as a sequence of time points at which the in-phase component and quadrature component signals become zero; and a signal reconstruction unit for reproducing the in-phase component and quadrature component from the real-zero sequence.

The receiver apparatus of the present invention is also characterized in that the real-zero signal generator includes a time digital converter for measuring time points at which the in-phase component and quadrature component signals become zero.

The receiver apparatus of the present invention is also characterized in that the in-phase and quadrature component detector includes an amplifier for limiter-amplifying the real-zero signal.

The receiver apparatus of the present invention is also characterized in that the in-phase and quadrature component detector includes an amplifier for limiter-amplifying the in-phase component signal and quadrature component signal extracted from the real-zero signal.

The receiver apparatus of the present invention further includes a signal strength detector for detecting the signal strength of the real-zero signal, and is characterized in that the in-phase and quadrature component detector includes a signal correction unit for correcting in-phase component and quadrature component signals based on the signal strength.

The receiver apparatus of the present invention is characterized in that a multi-carrier signal that has multi-carrier modulated the modulated wave is received and the signal reconstruction unit reconstructs each subcarrier signal of the multi-carrier signal.

A communication system of the present invention is a communication system comprising a transmitter apparatus transmitting a quadrature-modulated, modulated wave and a receiver apparatus receiving a modulated wave transmitted from the transmitter apparatus, and is characterized in that the receiver apparatus includes: an in-phase and quadrature component detector for extracting an in-phase component signal and a quadrature component signal from a real-zero signal of the modulated wave to which a sinusoidal wave has been added; a real-zero sequence generator for generating a real-zero sequence as a sequence of time points at which the in-phase component and quadrature component signals become zero; and a signal reconstruction unit for reproducing the in-phase component and quadrature component from the real-zero sequence.

The communication system of the present invention is characterized in that the receiver apparatus further includes a real-zero signal generator for adding a sinusoidal wave to the modulated wave to generate a real-zero signal.

The communication system of the present invention is characterized in that the transmitting apparatus further includes a reference signal adder for adding a sinusoidal wave to the modulated wave and the receiver apparatus further includes a real-zero signal generator for generating a real-zero signal based on the sinusoidal wave.

A reception method of the present invention is a reception method for receiving a quadrature-modulated, modulated wave, comprising: a real-zero signal generating step of adding a sinusoidal wave to the modulated wave to generate a real-zero signal; an in-phase/quadrature component detecting step of extracting an in-phase component signal and a quadrature component signal from the real-zero signal; a real-zero sequence generating step of generating a real-zero sequence as a sequence of time points at which the in-phase component and quadrature component signals become zero; and a signal reconstructing step of reproducing the in-phase component and quadrature component from the real-zero sequence.

A communication method of the present invention is a communication method comprising a transmitting process of transmitting a quadrature-modulated, modulated wave and a receiving process of receiving a modulated wave transmitted from the transmitter apparatus, characterized in that the receiving process includes: a real-zero signal generating step of adding a sinusoidal wave to the modulated wave to generate a real-zero signal; an in-phase/quadrature component detecting step of extracting an in-phase component signal and a quadrature component signal from the real-zero signal; a real-zero sequence generating step of generating a real-zero sequence as a sequence of time points at which the in-phase component and quadrature component signals become zero; and a signal reconstructing step of reproducing the in-phase component and quadrature component from the real-zero sequence.

Effect of the Invention

According to the present invention, it is possible to suppress degradation of decoding accuracy of the received signal even when sufficient linearity cannot be secured in the analog circuit of the receiver apparatus.

That is, the receiver receives a quadrature-modulated, modulated wave, adds a sinusoidal wave to the modulated wave to generate a real-zero signal, then extracts an in-phase component signal and a quadrature component signal from the real-zero signal, generates a real-zero sequence as a sequence of time points at which the in-phase component and quadrature component signals become zero and reproduces the in-phase component and quadrature component from the generated real-zero sequence. As a result, it is possible to perform high-precision quadrature-detection of the received signal even in the analog circuit that operates with low power-source voltage.

According to the present invention, provision of a time digital converter that measures time points at which the in-phase component and quadrature component signals become zero, enables conversion of analog signals to digital signals with a high quantization accuracy even in the analog circuit that operates at low voltage, hence makes it possible to cut down power consumption.

According to the present invention, provision of an amplifier for limiter-amplifying the real-zero signal, enables signal amplification with a low-voltage analog circuit, hence making it possible to promote low power consumption of the receiver apparatus According to the present invention, limiter-amplification of the in-phase component signal and quadrature component signal extracted from the real-zero signal makes it possible to perform signal amplification in low-frequency band such as the baseband or the like, using a low voltage circuit. Accordingly, it is possible to lower the amplification factor of the amplifier at high frequency such as the carrier wave frequency or the like, hence promote low power consumption of the receiver apparatus.

According to the present invention, by detecting the signal strength of the real zero signal, it is possible to correct in-phase component and quadrature component signals based on the signal strength. As a result, it is possible to reproduce the in-phase component and quadrature component with high precision, regardless of the received signal strength, bandwidth of the received signal and the frequency of the sinusoidal wave added when the real-zero signal is generated.

According to the present invention, a multi-carrier signal that has multi-carrier modulated the modulated wave is received and each subcarrier signal of the multi-carrier signal is reconstructed. As a result, it is possible to perform high-precision decoding at low power consumption even when a signal is multi-carrier modulated with a high PAPR (Peak to Average Power Ratio).

MODES FOR CARRYING OUT THE INVENTION

Now, the best modes for carrying out the present invention will be described with reference to the drawings.

[The First Embodiment]

The communicating system in the first embodiment includes a transmitter apparatus that transmits a signal obtained by modulating channel-coded, coded bits based on quadrature modulation (IQ modulation) such as PSK (Phase Shift Keying), QAM (Quadrature Amplitude Modulation) or the like, using a single carrier transmission scheme; and a receiver apparatus that receives a signal output from the transmitter apparatus. The receiver apparatus reproduces in-phase and quadrature components using a real-zero signal.

Figure 1:
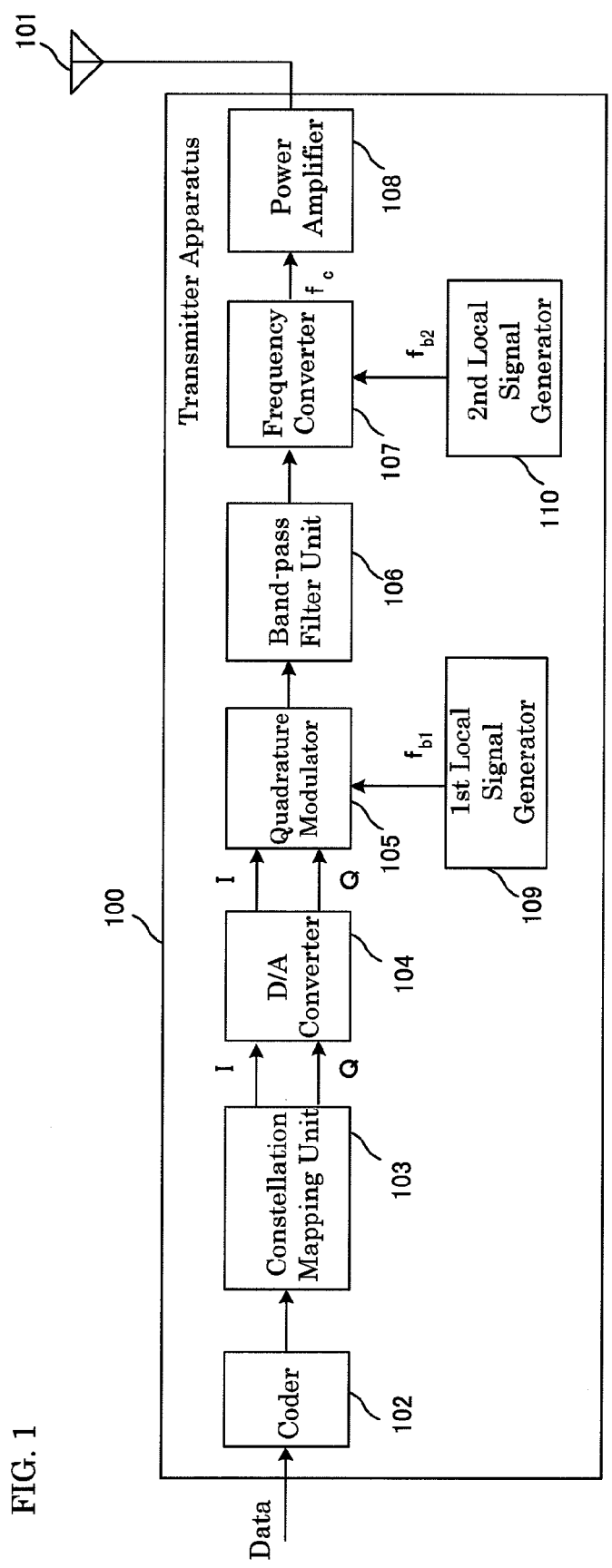
[FIG. 1] is a diagram for illustrating a configuration of a transmitter apparatus in the first embodiment.

FIG. 1 is a schematic block diagram showing a configuration of a transmitter apparatus 100 in the first embodiment. Transmitter apparatus 100 includes an encoder 102, a constellation mapping unit 103, a DA converter 104, a quadrature modulator 105, a band-pass filter unit 106, a frequency converter 107, a power amplifier 108, a first local signal generator 109 and a second local signal generator 110, and is connected to antenna unit 101.

In transmitter apparatus 100, encoder 102 is a functional unit that performs error correction coding of data bits as the digital signal input from an apparatus that forms an unillustrated upper layer and outputs coded bits to constellation mapping unit 103.

Constellation mapping unit 103 is a functional unit that maps the coded bits input from encoder 102 onto the in-phase component (real number component, I) and the quadrature component (imaginary number component, Q), based on the number of multilevel modulation.

Figure 2:
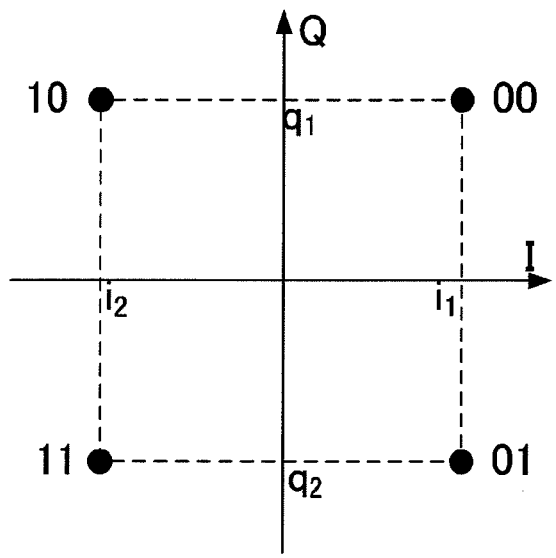
[FIG. 2] is a diagram showing an operational principle in the first embodiment.

FIG. 2 shows a mapping example when coded bits are modulated by QPSK (the number of multilevel modulation: 2 bits). For example, if encoded bits "00" are input from encoder 102, constellation mapping unit 103 outputs an in-phase component value i1 and a quadrature component value q1, in accordance with the mapping rule shown in FIG. 2.

Next, DA converter 104 is a functional part that converts the in-phase component and quadrature component output from constellation mapping unit 103, from digital to analog signals and outputs the result to quadrature modulator 105.

Quadrature modulator 105 performs quadrature modulation by multiplying the in-phase and quadrature components input from DA converter 104 with the carrier wave input from first local signal generator 109 and outputs the modulated wave to band-pass filter unit 106. Detailedly, first local signal generator 109 multiplies the in-phase component value and quadrature phase value, by a sinusoidal wave having a center frequency fb1 that is generated by first local signal generator 109. The sinusoidal wave by which the quadrature component value is multiplied is shifted in phase by $\pi/2$ from the sinusoidal wave by which the in-phase component is multiplied. Further, the quadrature modulator 105 adds up the signal obtained by multiplying the in-phase component by the sinusoidal wave and the signal obtained by multiplying the quadrature component by the sinusoidal wave to generate a modulated wave. This fb1 is also called an intermediate frequency (Intermediate Frequency: IF).

Band-pass filter unit 106 is a functional part that removes out-of-band radiation from the modulated wave input from quadrature modulator 105 and extracts the modulated wave of the desired band including the center frequency to output the resultant to frequency converter 107.

Frequency converter 107 multiplies the modulated wave input from band-pass filter unit 106 by a sinusoidal wave generated by second local signal generator 110 to thereby perform up-conversion up to the transmission frequency band of transmitter apparatus 100. When the carrier wave frequency of transmission signal of transmitter apparatus 100 is denoted by fc, the frequency of the sinusoidal wave generated by second local signal generator 110, fb2 is given as fc−fb1. This fc is also called radio frequency (Radio Frequency: RF). The modulated wave output from frequency converter 107 is amplified by power amplifier 108 up to the specified transmission power of transmitter apparatus 100 and is transmitted via antenna unit 101. The transmission signal s(t) of transmitter apparatus 100 is presented as the following expression (1).

[Math 1]

(1)     $s(t) = a(t)\cos[2\pi f_c t + \phi(t)]$

Here, a(t) is the modulation amplitude and φ(t) is the modulation phase.

The transmission signal s(t) can be represented by the following expression (2) when a complex envelop e(t) is used
[Math 2]

$$s(t) = \Re[e(t)e^{j2\pi f_c t}] \qquad (2)$$

$$e(t) = a(t)e^{j\phi(t)} = i(t) + jq(t)$$

Here, i(t) is the in-phase component value and q(t) is the quadrature component value, and j represents the imaginary unit and R[x] represents the real part of x.

Figure 3:
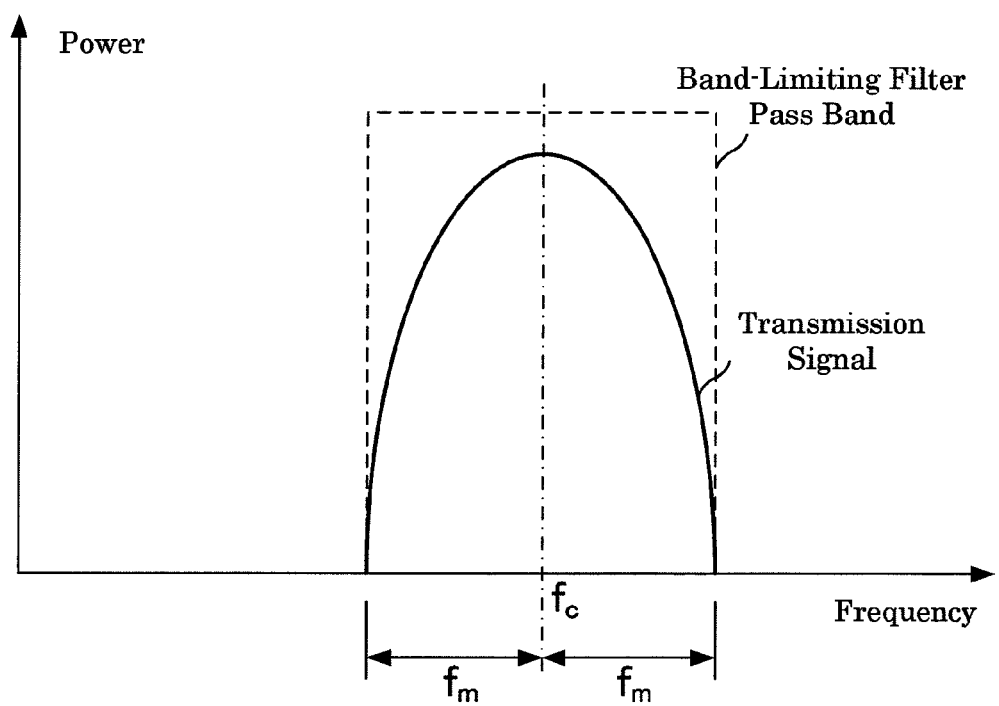
[FIG. 3] is a diagram for illustrating an operational principle in the first embodiment.

FIG. 3 is a spectrum example of a quadrature-modulated transmission signal s(t). The transmission signal s(t) is a modulated wave having a center carrier wave frequency fc with a bandwidth of ±fm.

Figure 4:
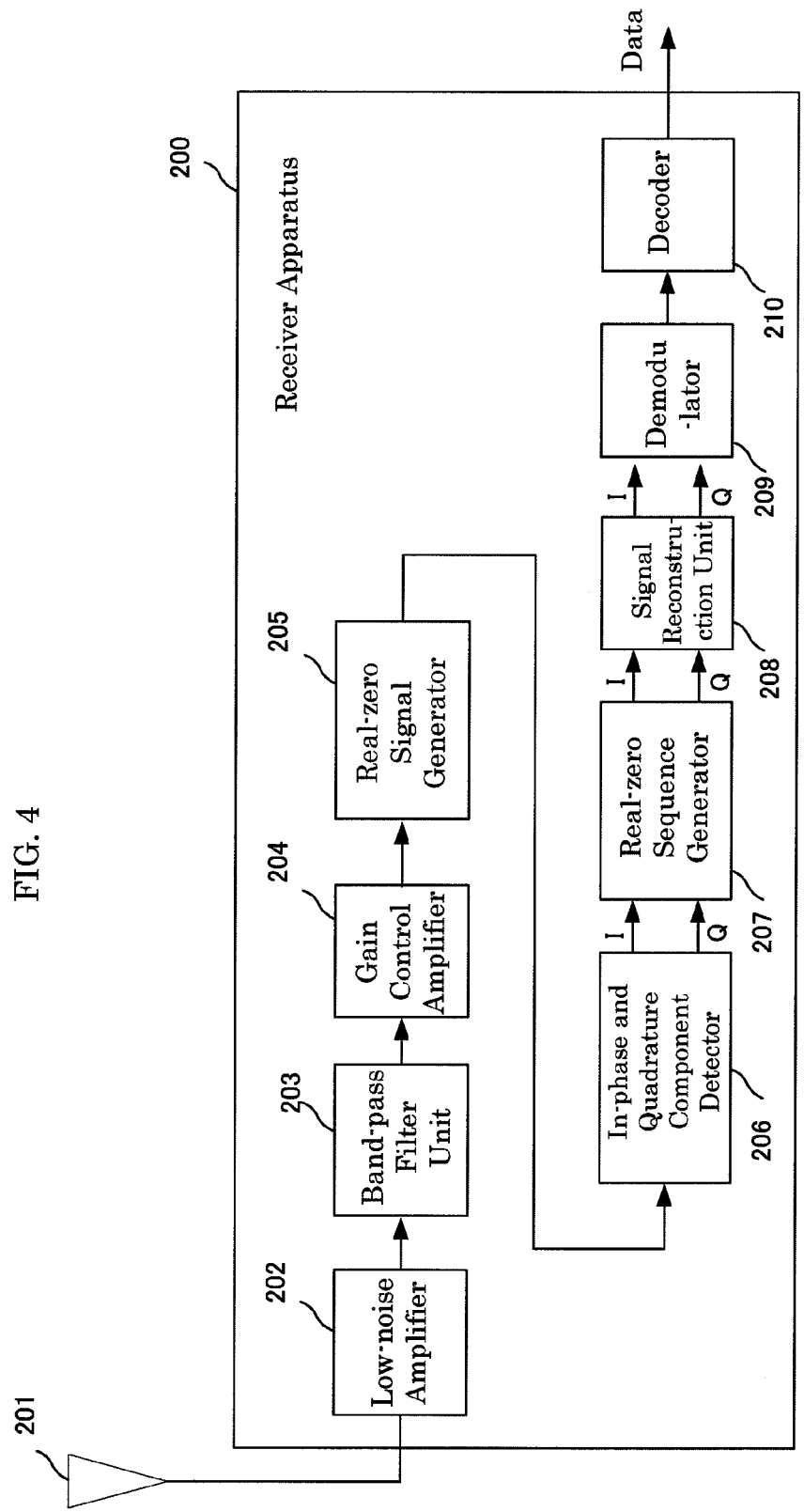
[FIG. 4] is a diagram for illustrating a configuration of a receiver apparatus in the first embodiment.

Next, FIG. 4 is a schematic block diagram showing a configuration of a receiver apparatus 200 in the present embodiment. As illustrated, receiver apparatus 200 includes a low-noise amplifier 202 (LNA: Low Noise Amplifier), a band-pass filter unit 203, a gain control amplifier 204, a real-zero signal generator 205 (reference signal adder), an in-phase and quadrature component detector 206, a real-zero sequence generator 207, a signal reconstruction unit 208, a demodulator 209 and a decoder 210, and is connected to an antenna unit 201.

In receiver apparatus 200, low-noise amplifier 202 is a functional part that amplifies the signal transmitted from transmitter apparatus 100 and received via antenna unit 201 and outputs the resultant to band-pass filter unit 203.

Band-pass filter unit 203 is a functional part that removes signals other than the desired band from the signals input from the low-noise amplifier 202 to extract a modulated wave of the desired band. The extracted modulated wave is output to gain control amplifier 204. Band-pass filter unit 203 presents a pass bandwidth of 2×fm to extract the band of fc±fm having a center frequency fc when receiving the transmission signal from the transmitter apparatus 100.

Gain control amplifier 204 amplifies the power of the modulated wave input from band-pass filter unit 203 to such a level that the signal can be processed by real-zero signal generator 205 and also adjusts the power of the signal input from the band-pass filter unit so as to be smaller than the signal power of the sinusoidal wave added by real-zero signal generator 205 (the details will be described below). When the signal output by gain control amplifier 204 is denoted as r(t), r(t) can be given as the following expression.
[Math 3]

$$r(t) = A_p h(t) s(t) + n(t) \qquad (3)$$

Here, Ap is the total gain of the desired band from low-noise amplifier 202 to gain control amplifier 204 and h(t) is the channel coefficient between the transmitter side and receiver side.

Figure 5:
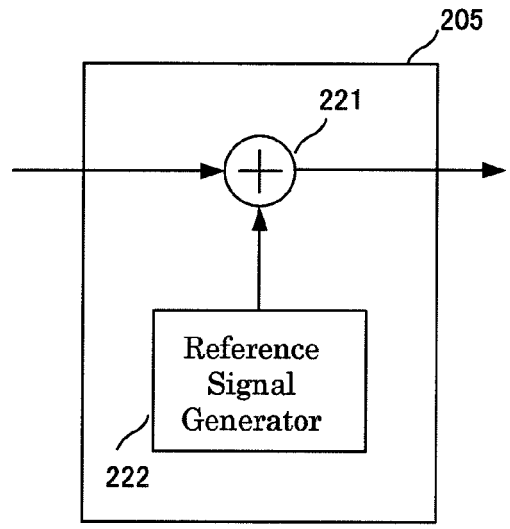
[FIG. 5] is a diagram for illustrating a configuration of a real-zero signal generator in the first embodiment.

Real-zero signal generator 205 generates a real-zero signal by adding a sinusoidal wave to the signal input from gain control amplifier 204. FIG. 5 is a schematic block diagram showing a configuration of real-zero signal generator 205.

Real-zero signal generator 205 includes an adder 221 and a reference signal generator 222. Reference signal generator 222 generates a sinusoidal wave ra(t) having a frequency fa. Adder 221 adds the sinusoidal wave ra(t) to the received signal r(t) output by gain control amplifier 204 to generate a real-zero signal rz(t).

Received signal r(t) is adjusted by the gain control amplifier 204 so that the maximum value of its complex envelop will be smaller than the amplitude of sinusoidal wave ra(t). When the amplitude of sinusoidal wave ra(t) is denoted by Au and the complex envelop of received signal r(t) output from gain control amplifier 204 is denoted by er(t), gain control amplifier 204 is adjusted so that following relation (4) holds.
[Math 4]

$$A_u > \max|e_r(t)| \qquad (4)$$

$$e_r(t) = A_p h(t) a(t) e^{j\phi(t)} = A_p h(t) e(t)$$

Figure 6:
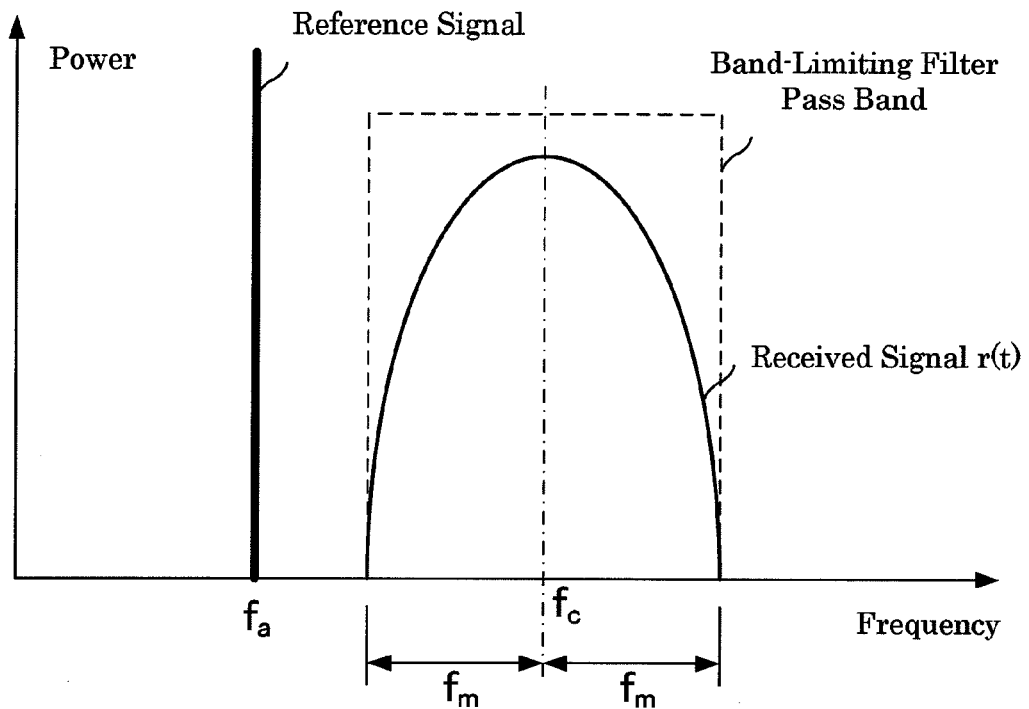
[FIG. 6] is a diagram for illustrating an operational principle in the first embodiment.

Here, it is preferable that the frequency fa of sinusoidal wave ra(t) falls out of the pass band of the band-pass filter unit 203. Specifically, when it is assumed that the pass bandwidth of the band-pass filter unit 203 is 2×fm, it is preferable that fa<fc−fm and fa>fc+fm hold. Further, the relation of the frequency fa of sinusoidal wave ra(t) with the carrier wave frequency fc of the received signal r(t) may be either fa<fc or fa>fc. FIG. 6 shows a spectrum of the real-zero signal output from adder 221 when fa<fc holds.

The real-zero signal rz(t) output by adder 221 is shown as the following expression (5). For simplicity, it is assumed hereinbelow that Ap×h(t)=1 That is, er(t)=e(t) holds. It is also assumed hereinbelow that the frequency fa of sinusoidal wave ra(t) is set on the very edge of the pass band, hence a case where fa=fc−fm is presented.
[Math 5]

$$r_z(t) = r(t) + r_a(t) \qquad (5)$$

$$r_a(t) = A_u \cos[2\pi f_a t + \phi_a]$$

Here, φa is the phase of sinusoidal wave ra(t).

Further, when in a complex representation, real-zero signal rz(t) is given by the following expression (6).
[Math 6]

$$r_z(t) = \Re[e_z(t)e^{j2\pi f_c t}] \qquad (6)$$

$$e_z(t) = e(t) + A_u e^{j(2\pi f_m t + \phi_a)}$$

Figure 7:
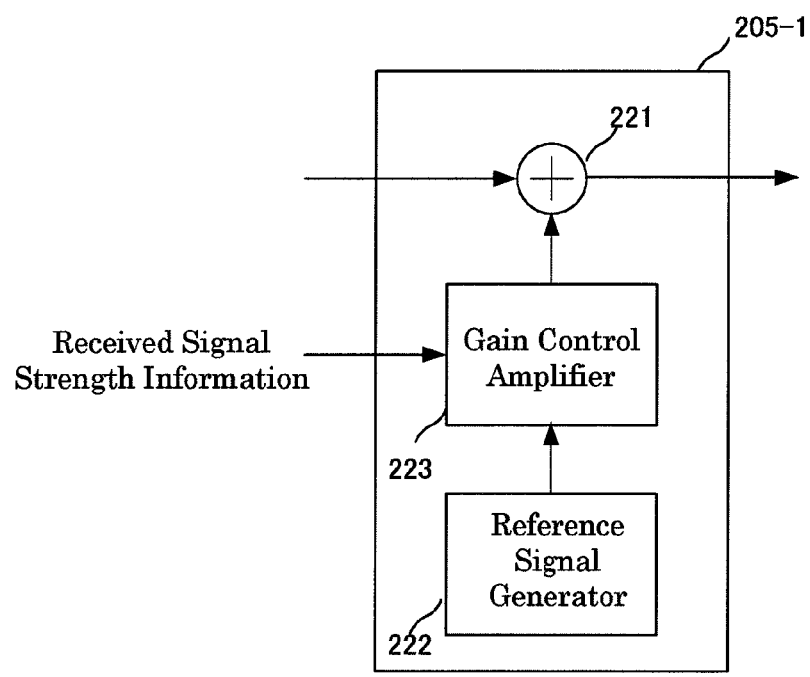
[FIG. 7] is a diagram for illustrating a configuration of real-zero signal generator in the first embodiment.

FIG. 7 is a schematic block diagram showing another configuration of a real-zero signal generator. A real-zero signal generator 205-1 in FIG. 7 is different from the real-zero signal generator 206 in FIG. 5 in that a gain control amplifier 223 is provided. Gain control amplifier 223, based on the signal strength information of the received signal, adjusts the amplitude Au of the sinusoidal wave input from reference signal generator 222. Detailedly, the amplitude Au is adjusted based on Ap×h(t) so as to satisfy the above expression (4).

Accordingly, this replacement of real-zero signal generator 205 with real-zero signal generator 205-1 enables adjustment of the amplitude Au of the sinusoidal wave, so that control by gain control amplifier 204 may be done in a narrower operational range with rough accuracy. Further, when control is schemed so as to satisfy the above-described expression (4) by use of gain control amplifier 223 only, it is possible to eliminate gain control amplifier 204. These makes it possible to reduce power consumption of the receiver apparatus.

Here, examples of the received signal strength information include the channel estimate value calculated by channel estimation (not shown in the drawing), the received signal strength measured by RSSI (Received Signal Strength Indicator, not shown in the drawing) provided for the receiver apparatus and others.

Figure 8:
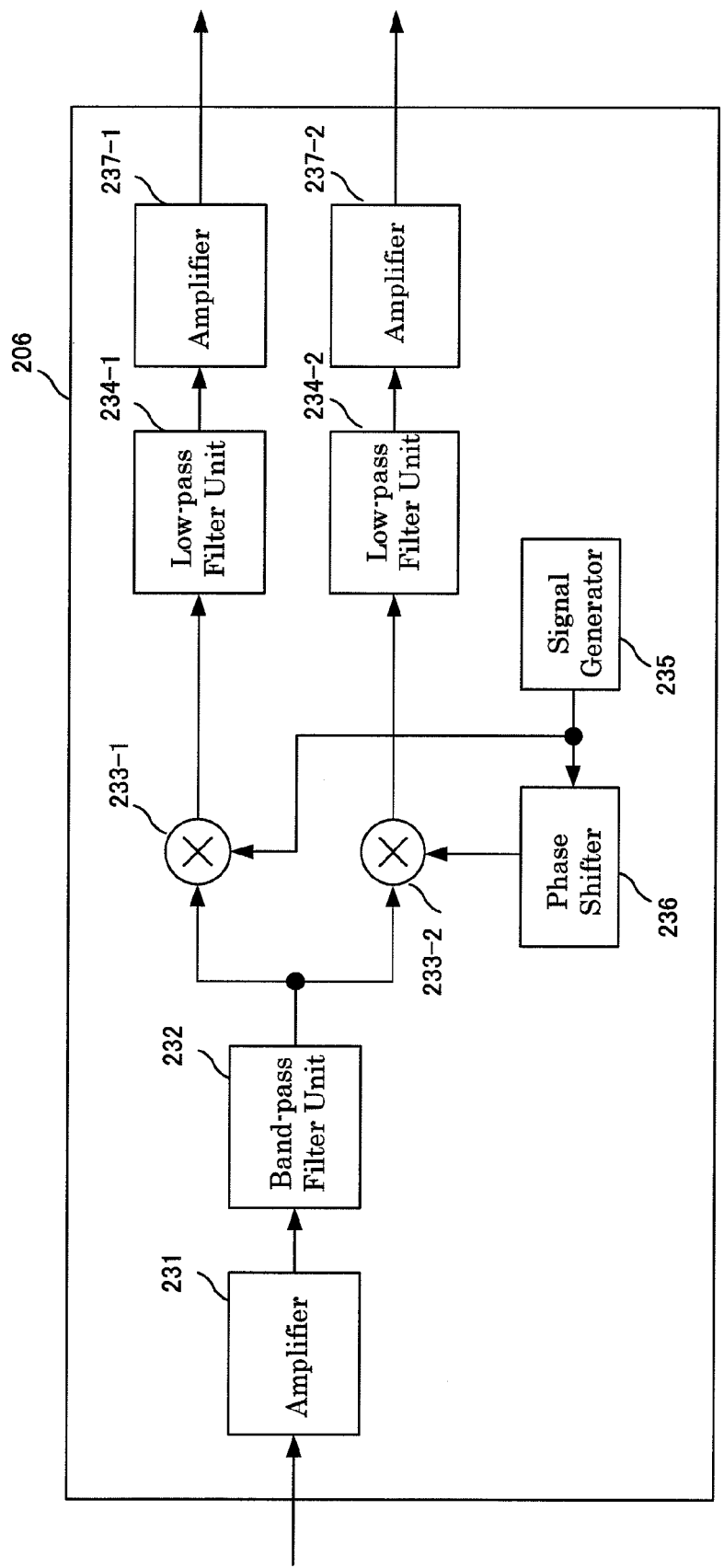
[FIG. 8] is a diagram for illustrating a configuration of an in-phase and quadrature component detector in the first embodiment.

Returning to FIG. 4, in-phase and quadrature component detector 206 extracts the in-phase component (real number component, I-component) and quadrature component (imaginary number component, Q-component) from real-zero signal rz(t) input from real-zero signal generator 205. FIG. 8 is a schematic block diagram showing a configuration of in-phase and quadrature component detector 206. In-phase and quadrature component detector 206 includes an amplifier 231, a band-pass filter unit 232, multipliers 233-1 and 233-2, low-pass filter units 234-1 and 234-2, a signal generator 235, a phase shifter 236, amplifiers 237-1 and 237-2.

Figure 9:
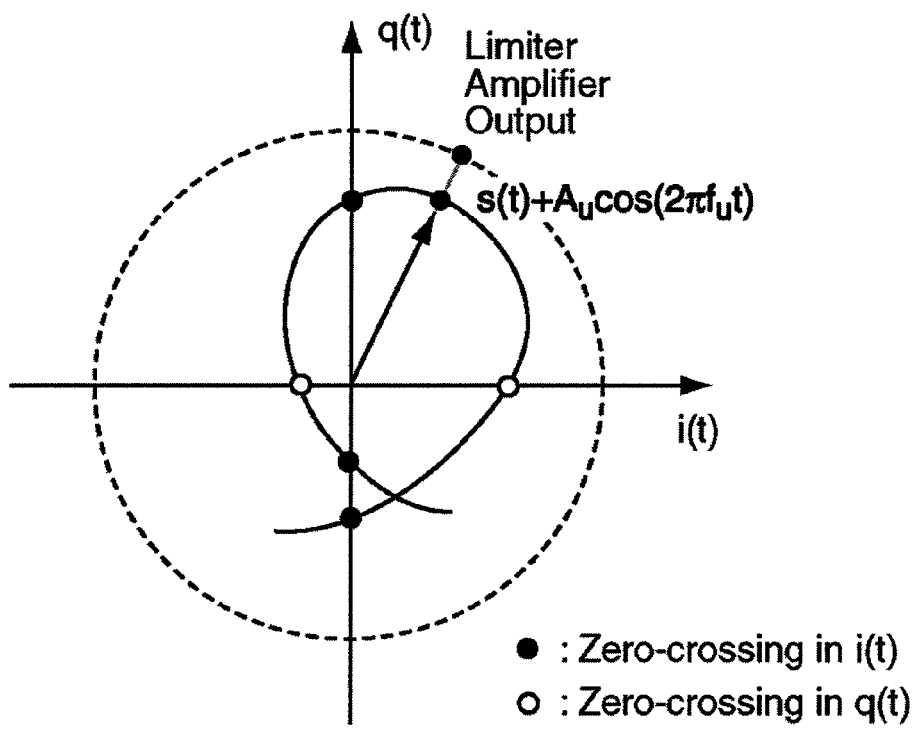
[FIG. 9] a diagram for illustrating a configuration of a real-zero signal generator in the first embodiment.

Amplifier 231 is a functional part that amplifies the real-zero signal input from real-zero signal generator 205. FIG. 9 shows the change of the waveform on the complex plane when the real-zero signal rz(t) is saturation-amplified. The broken line shows the trace of the in-phase and quadrature components when the real-zero signal is saturation-amplified by limiter amplification. The solid line is an example of the trace of the signal points that are rendered on the I-Q plane by rz(t) shown in the above expression (5) (when φa=0). A black round indicates the point at which the in-phase component of the real-zero signal is equal to 0 (zero). A white round indicates the point at which the quadrature component of the real-zero signal is equal to 0. That is, the real-zero signal rz(t) forms points (real zero) at which the in-phase component and quadrature component become zero.

When the real-zero signal is saturated, the phase is unvaried and the amplitude takes a fixed value. At this time, the time points of real zero at which in-phase component i(t) and quadrature component q(t) each cross zero are unvaried. Accordingly, the time of the moment of real zero is unvaried with respect to the limiter amplification.

Receiver apparatus 200 in the present embodiment, detection of the in-phase component and quadrature component of the quadrature-modulated, modulated wave is performed using the time at which in-phase component i(t) and quadrature component q(t) of the real-zero signal cross zero. Therefore, if the time points at which in-phase component i(t) and quadrature component q(t) of the real-zero signal cross zero are precisely determined, it does not matter if the signal waveform is deformed.

Accordingly, the amplifier 231 may be an amplifier having a narrow linear region, which enables low power consumption. Further, the amplifier 231 may use a limiter amplifier that performs limiter amplification, which can further suppress the power consumption of receiver apparatus 200.

Band-pass filter unit 232 removes unnecessary higher harmonics from the real-zero signal input from amplifier 231 and outputs the resultant to multipliers 233-1 and 233-2.

Multiplier 233-1 multiplies the real-zero signal output from band-pass filter unit 232 and the sinusoidal wave output from signal generator 235. Signal generator 235 down-coverts the carrier wave frequency of the received signal and generates a sinusoidal wave having a frequency that permits the in-phase component and quadrature component of the received signal to be calculated. Receiver apparatus 200 of the present embodiment has a configuration using zero IF (Low-IF) so that the signal generator 235 generates a sinusoidal wave having a frequency fc.

Multiplier 233-2 multiplies the real-zero signal output from band-pass filter unit 232 and the sinusoidal wave output from phase shifter 236. Phase shifter 236 shifts the phase of the sinusoidal wave output from signal generator 235 by π/2.

Low-pass filter unit 234-1 removes unnecessary higher harmonics from the signal input from multiplier 233-1. Low-pass filter unit 234-2 removes unnecessary higher harmonics from the signal input from multiplier 233-2. Here, the in-phase component iz(t) and quadrature component qz(t) output from in-phase and quadrature component detector 206 (output from the low-pass filter units) can be given by the following expressions (7) and (8), where φa is set φa=0, for simplicity.

[Math 7]
$$i_z(t) = 2LPF[r_z(t)\cos 2\pi f_c t] \\ = i(t) + A_u \cos 2\pi f_m t \quad (7)$$

[Math 8]
$$q_z(t) = 2LPF[r_z(t)\sin 2\pi f_c t] \\ = q(t) + A_u \sin 2\pi f_m t \quad (8)$$

Here, LPF [x] is the low-pass filter output of x.

Amplifier 237-1 amplifies the in-phase component iz(t) output from low-pass filter unit 234-1. Amplifier 237-2 amplifies the quadrature component qz(t) output from low-pass filter unit 234-2.

The amplifier 237-1 and amplifier 237-2 amplify the signal amplitude to such a level as to calculate the real zero of the in-phase component and quadrature component. It is preferable that the amplifier 237-1 and amplifier 237-2 saturation-amplify in-phase component iz(t) and quadrature component qz(t) by limiter amplification or the like. Since it is possible for the amplifiers 237-1 and 237-2 to lower the amplification factor of the amplifiers for high frequencies such as carrier wave frequency and the like by performing saturation amplification in low frequency band (baseband range), it is possible to realize low power consumption in the receiver apparatus.

The signal vi(t) that is obtained by saturation-amplifying in-phase component iz(t) by the amplifier 237-1 and the signal vq(t) that is obtained by saturation-amplifying quadrature component qz(t) by the amplifier 237-2 are given by the following expressions (9) and (10).

[Math 9]
$$v_i(t) = \begin{cases} 1, & i_z(t) > 0 \\ -1, & i_z(t) < 0 \\ 0, & i_z(t) = 0 \end{cases} \quad (9)$$

[Math 10]
$$v_q(t) = \begin{cases} 1, & i_q(t) > 0 \\ -1, & i_q(t) < 0 \\ 0, & i_q(t) = 0 \end{cases} \quad (10)$$

Figure 10:
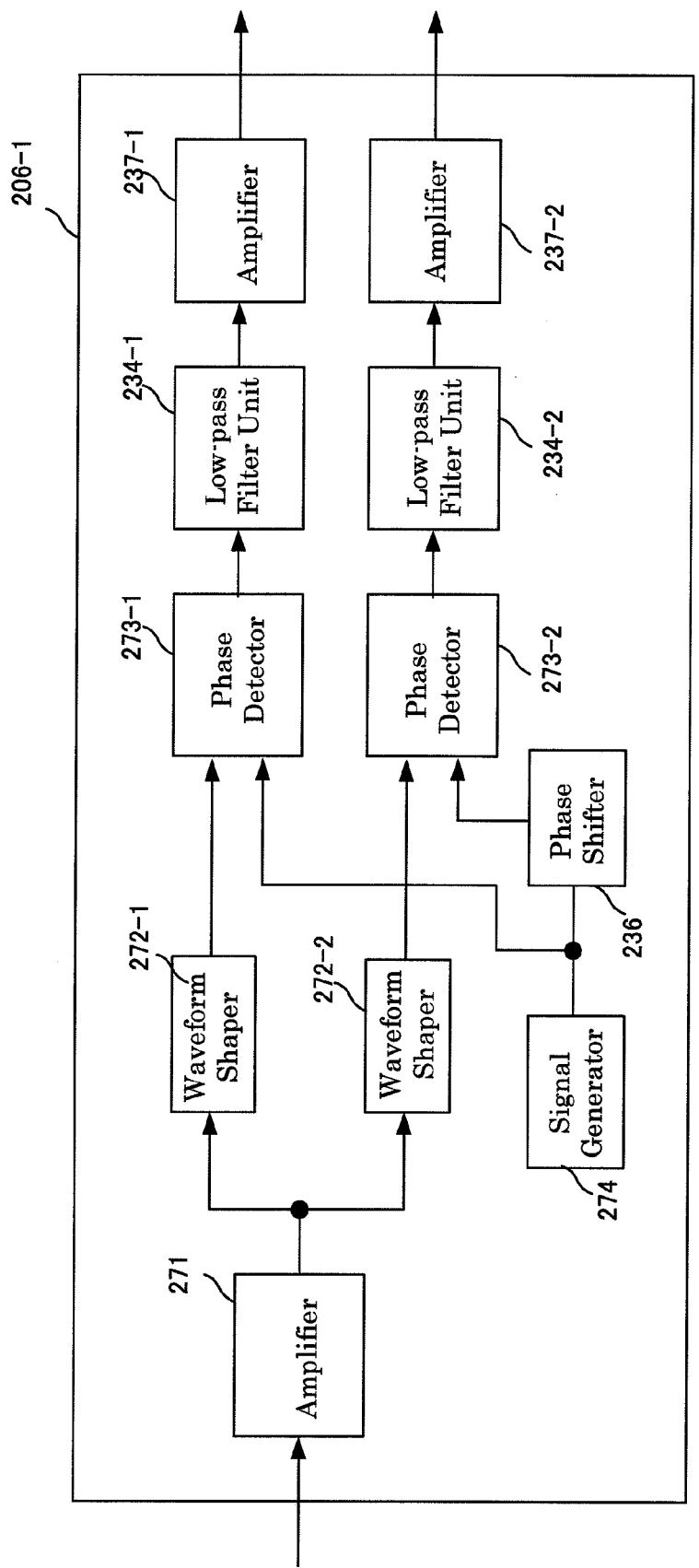
[FIG. 10] is a diagram for illustrating a configuration of an in-phase and quadrature component detector in the first embodiment.

FIG. 10 is a schematic block diagram showing another configuration of an in-phase and quadrature component detector. In-phase and quadrature component detector 206-1 includes an amplifier 271, waveform shapers 272-1 and 272-2, phase detectors 273-1 and 273-2, low-pass filter units 234-1 and 234-2, a signal generator 274, a phase shifter 236, amplifiers 237-1 and 237-2.

In-phase and quadrature component detector 206-1 is different from in-phase and quadrature component detector 206 in FIG. 8 in that in place of amplifier 231, band-pass filter unit 232, multipliers 233-1 and 233-2 and signal generator 235, amplifier 271, waveform shapers 272-1 and 272-2, phase detectors 273-1 and 273-2 and signal generator 274 are provided. Description hereinbelow will be made focusing on different components.

Amplifier 271 saturation-amplifies the real-zero signal input from real-zero signal generator 205. The output signal u(t) from amplifier 271 when real-zero signal r(t) is saturation-amplified can be represented by the following expression (11). Here, the following description will be given taking a case where $\phi a=0$, for simplicity.

[Math 11]

$$u(t) = \begin{cases} 1, & r_z(t) > 0 \\ -1, & r_z(t) < 0 \\ 0, & r_z(t) = 0 \end{cases} \quad (11)$$

$$r_z(t) = \tilde{A}\cos[2\pi f_c t + \phi_u(t)]$$

$$\tilde{A} = \sqrt{\tilde{i}(t)^2 + \tilde{q}(t)^2}$$

$$\tilde{i}(t) = i(t) + A_u \cos 2\pi f_m t$$

$$\tilde{q}(t) = q(t) + A_u \sin 2\pi f_m t$$

$$\phi_u(t) = \tan^{-1}\left(\frac{\tilde{q}(t)}{\tilde{i}(t)}\right) + \phi_m$$

$$\phi_m(t) = \begin{cases} 0 & \tilde{i} \geq 0 \\ \pi & \tilde{i} < 0 \end{cases}$$

$$-\pi/2 \leq \tan^{-1}(x) \leq \pi/2,$$

(x is a real number).

Waveform shapers 272-1 and 272-2 shape the signal input from amplifier 271 and generate a rectangular wave. Waveform shapers 272-1 and 272-2 may use, for example an inverter circuit (NOT circuit) or the like.

When the signal output from waveform shapers 272-1 and 272-2 are u'(t), u'(t) can be represented by the following expression (12). The output signals from waveform shapers 272-1 and 272-2 have a fixed amplitude, which is set at 1. For the phase, $\phi u(t)$ is kept up.

[Math 12]

$$u(t)' = rect[2\pi f_c t + \phi_u(t)] \quad (12)$$

$$rect(x) = \begin{cases} 1, & -\pi/2 < x \bmod 2\pi < \pi/2 \\ -1, & \pi/2 < x \bmod 2\pi < 3\pi/2 \\ 0, & x = \pi/2, -\pi/2 \end{cases}$$

Here, the rectangular function rect(x) has a period of $2\pi$.

Phase detector 273-1 compares the phase of the signal input from waveform shaper 272-1 with the phase of the signal output from signal generator 274 to extract the in-phase component (I-component) from the signal input from waveform shaper 272-1.

Signal generator 274 generates a rectangular wave to be the reference signal for phase detectors 273-1 and 273-2.

Phase detector 273-2 compares the phase of the signal input from waveform shaper 272-2 with the phase of the signal that is obtained by shifting the reference signal output from signal generator 274 by $\pi/2$ through phase shifter 236 so as to extract the quadrature component (Q-component) from the signal input from waveform shaper 272-2. For example, phase detectors 273-1 and 273-2 may include an exclusive OR circuit (Exclusive OR circuit).

Low-pass filter unit 234-1 removes unnecessary higher harmonics from the signal input from phase detector 273-1, and outputs the resultant to amplifier 273-1. Low-pass filter unit 234-2 removes unnecessary higher harmonics from the signal input from phase detector 273-2 and outputs the resultant to amplifier 237-2.

When the reference signal input to phase detectors 273-1 and 273-2 is represented as ur(t), ur(t) is given by the following expression (13). The reference signal ur(t) input to phase detector 273-1 takes $\phi 0$ of 0, and the reference signal ur(t) input to phase detector 273-1 takes $\phi 0$ of $\pi/2$.

[Math 13]

$$u_r(t) = rect[2\pi f_c t + \phi_0] \quad (13)$$

The output signal v'i(t) from low-pass filter unit 234-1 and the output signal v'q(t) from low-pass filter unit 234-2 are given by the following expressions (14) and (15).

[Math 14]

$$v_i'(t) = LPF[u'(t)u_r(t)] \quad (14)$$
$$= tri[\phi_u(t) - \phi_0]$$
$$= tri[\phi_u(t)]$$

$$v_q'(t) = LPF[u(t)'u_r(t)] \quad (15)$$
$$= tri[\phi_u(t) - \phi_0]$$
$$= tri[\phi_u(t) - \pi/2]$$

$$tri(t) = \begin{cases} 1 - \frac{2}{\pi}x, & 0 < x \leq \pi \\ 1 + \frac{2}{\pi}x, & -\pi < x \leq 0 \end{cases}$$

Here, tri(x) is a triangle function composed of positive and negative triangular waveforms having a width of $\pi$ with period $2\pi$.

The output signal v'i(t) from low-pass filter unit 234-1 is saturation-amplified by amplifier 237-1 so that the output signal vi(t) is given by the following expression (16). The output signal v' q(t) from low-pass filter unit 234-2 is saturation-amplified by amplifier 237-2 so that the output signal vq(t) is given by the following expression (17).

[Math 16]

$$v_i(t) = rect[\phi_u(t)] \quad (16)$$

[Math 17]

$$v_i(t) = rect[\phi_u(t) - \pi/2] \quad (17)$$

Returning to FIG. 4, real-zero sequence generator 207 calculates sequences (zero-cross sequences) of time points at which the in-phase component signal vi(t) and quadrature component signal vq(t) output from in-phase and quadrature component detector 206, become zero (time points when the signals cross zero, time points of real zero). In FIG. 9, the time of the points at which the in-phase component is 0 (zero) as indicated by the black round and the points at which the quadrature component is 0 as indicated by the white round, is calculated. It is noted that this operation is the function equivalent to the function of converting the signal from analog signal to digital signal in the prior art.

The zero cross sequence of in-phase component vi(t) and the zero cross sequence of quadrature component vq(t) become to satisfy the following expressions (18) and (19). The in-phase component vi(t) is the signal that is obtained by saturation-amplifying iz(t) and the quadrature component vq(t) is the signal that is obtained by saturation-amplifying iq(t).

[Math 18]

$$i_z(t_{i,m_i}) = i(t_{i,m_i}) + A_u \cos(2\pi f_m t_{i,m_i}) = 0 \quad (18)$$

[Math 19]

$$q_z(t_{q,m_q}) = q(t_{q,m_q}) + A_u \cos(2\pi f_m t_{q,m_q}) = 0 \quad (19)$$

Real-zero sequence generator 207 outputs an in-phase component zero-cross sequence $\tau i$ represented by the following expression (20) and a quadrature component zero-cross sequence τq represented by the following expression (21).
[Math 20]

$$\tau_i = \{t_{i,m_i}\} = \{\ldots, t_{i,-1}, t_{i,0}, t_{i,1}, \ldots\} \quad (20)$$

[Math 21]

$$\tau_q = \{t_{q,m_q}\} = \{\ldots, t_{q,-1}, t_{q,0}, t_{q,1}, \ldots\} \quad (21)$$

When the in-phase and quadrature component detector 206-1 illustrated in FIG. 10 is applied, the zero-cross sequence of in-phase component vi(t) is the sequence of time points at which φu(t) is equal to ±π/2 in expression (16) and becomes the sequence equivalent to expression (20). Similarly, the zero-cross sequence of quadrature component vq(t) becomes the sequence equivalent to expression (21).

Figure 11:
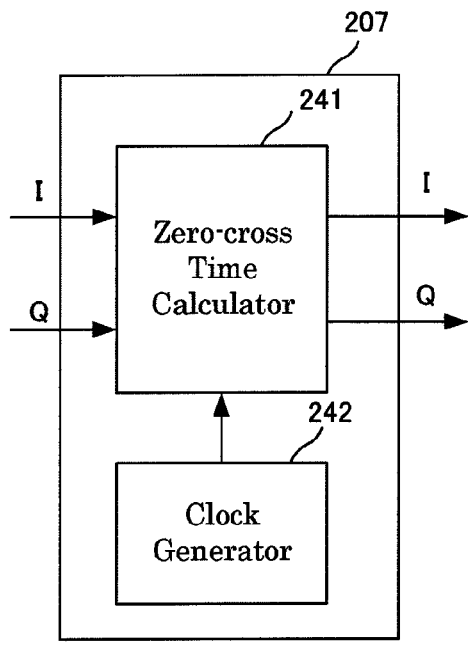
[FIG. 11] is a diagram for illustrating a configuration of a real-zero sequence generator in the first embodiment.

FIG. 11 is a schematic block diagram illustrating a configuration of real-zero sequence generator 207. Real-zero sequence generator 207 includes a zero-cross time calculator 241 (also called as a time digital converter) and a clock generator 242.

Zero-cross time calculator 241, based on a clock generated by clock generator 242, measures time points at which the in-phase component and quadrature component become zero, from in-phase component vi(t) and quadrature component vq(t) input from in-phase and quadrature component detector 206 and outputs the time in digital form.

Figure 12:
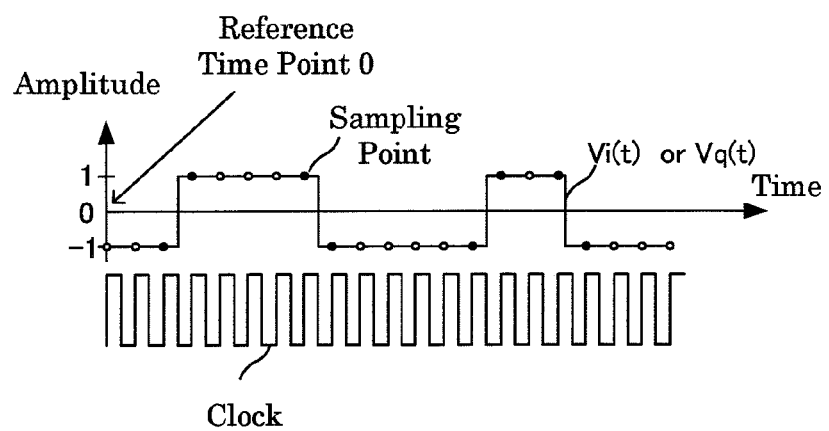
[FIG. 12] is a diagram for illustrating an operational principle in the first embodiment.

FIG. 12 shows an operation in which real-zero sequence generator 207 measures zero-cross points. The signal of in-phase component vi(t) or vq(t) is sampled based on the clock (in FIG. 12, each positive edge of the clock is used as a sampling point), so as to estimate the time point at which the signal of in-phase component vi(t) or vq(t) changes from plus to minus (zero cross time, the time of the sampling points shown by the black round in FIG. 12) to thereby determine zero cross points. For example, the zero cross time point from the reference time is calculated.

It is preferred that the clock generated by clock generator 242 has a high-time resolution. For example, it is possible to use a high time-resolution clock having a high time resolution of pico-second order, realized by combination of a digital control oscillator and a time digital converter. As an example of this technology, "Staszewski, et al. All-Digital TX Frequency Synthesizer and Discrete-Time Receiver for Bluetooth Radio in 130-nm CMOS," IEEE J. Solid-State Circuits, vol. 39, Issue 12, pp. 2278-2291, December 2004" can be mentioned.

Figure 13:
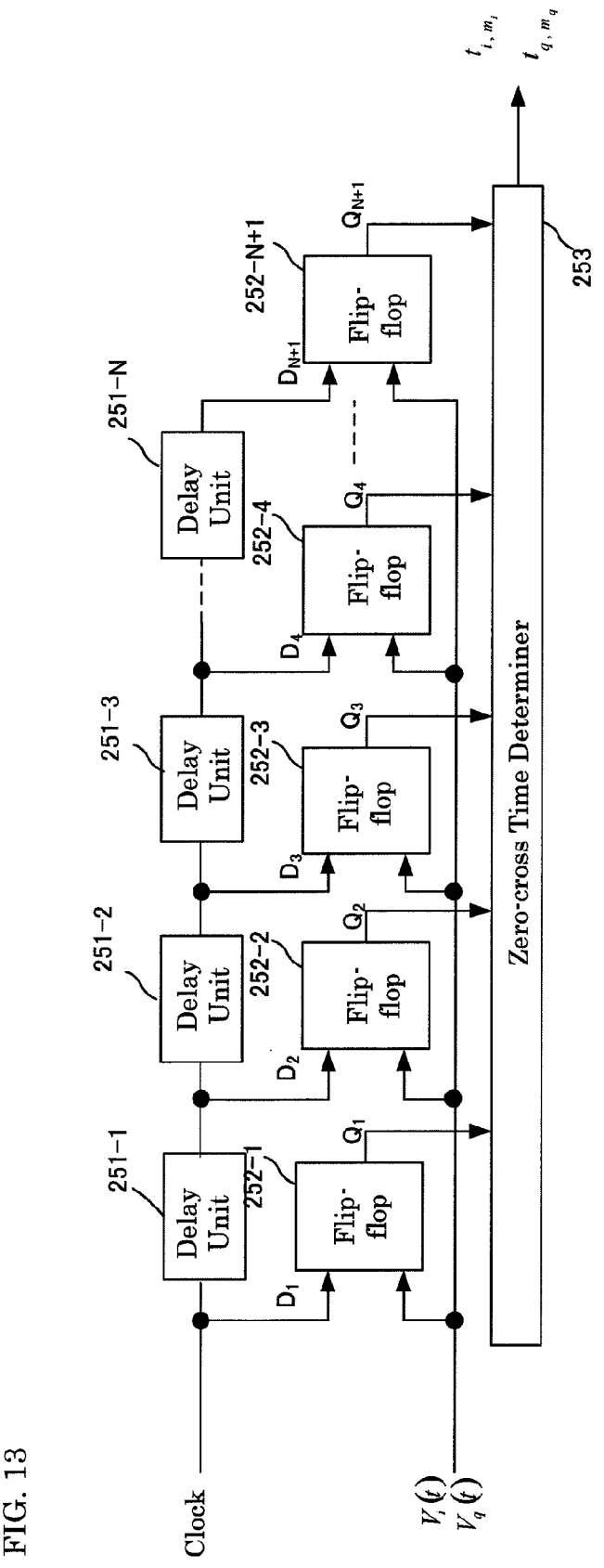
[FIG. 13] is a diagram for illustrating a configuration of a zero-cross time calculator in the first embodiment.

Here, a schematic block diagram showing a configuration of zero-cross time calculator 241 is shown in FIG. 13. FIG. 13 includes delay units 251-1 to 251-N, flip-flop units 252-1 to 252-N+1 and a zero-cross time determiner 253.

Delay units 251-1 to 251-N are connected in series, forming a delay line. Delay units 251-1 to 251-N each delay the input signal by ti and then outputs the signal. For example, an inverters (Not circuit) may be used as delay units 251-1 to 251-N.

Flip-flop units 252-1 to 252-N+1 each output the value of the clock signal input from clock generator 242 or the signal obtained as a result of the clock signal having passed through some delay units, at the time of positive edge of the signal input from in-phase and quadrature component detector 206. For example, D-flip-flops can be applied as flip-flop units 252-1 to 252-N+1.

Zero-cross time determiner 253, based on the signals output from flip-flop units 252-1 to 252-N+1, determines the point of time at which the signal input from in-phase and quadrature component detector 206 changes from plus to minus.

The clock generated by clock generator 242 is input to delay unit 251-1. Delay unit 251-N receives the clock output from delay units 251-(N−1). The clock output from delay unit 251-N is delayed by NT from the clock input to delay unit 251-1. Input to flip-flop unit 252-n (N=1, ..., N) are in-phase component vi(t) or quadrature component vq(t) input from in-phase and quadrature component detector 206 and the clock output from delay unit 251-(n−1).

Flip-flop unit 252-n outputs the clock input from delay unit 251-(n−1) at the point where the in-phase component vi(t) or quadrature component vq(t) input from in-phase and quadrature component detector 206 changes (the point where the signal changes from minus to plus or from plus to minus). Zero-cross time determiner 253 calculates the zero-cross time by measuring to which point the edge of the reference clock has propagated in the delay line of delay units 251-1 to 251-N, by the time of the point at which in-phase component vi(t) or quadrature component vq(t) changes. Accordingly, in the zero-cross time calculator 241 in FIG. 13, it is possible to estimate the zero-cross time with a time resolution of τ.

Figure 14:
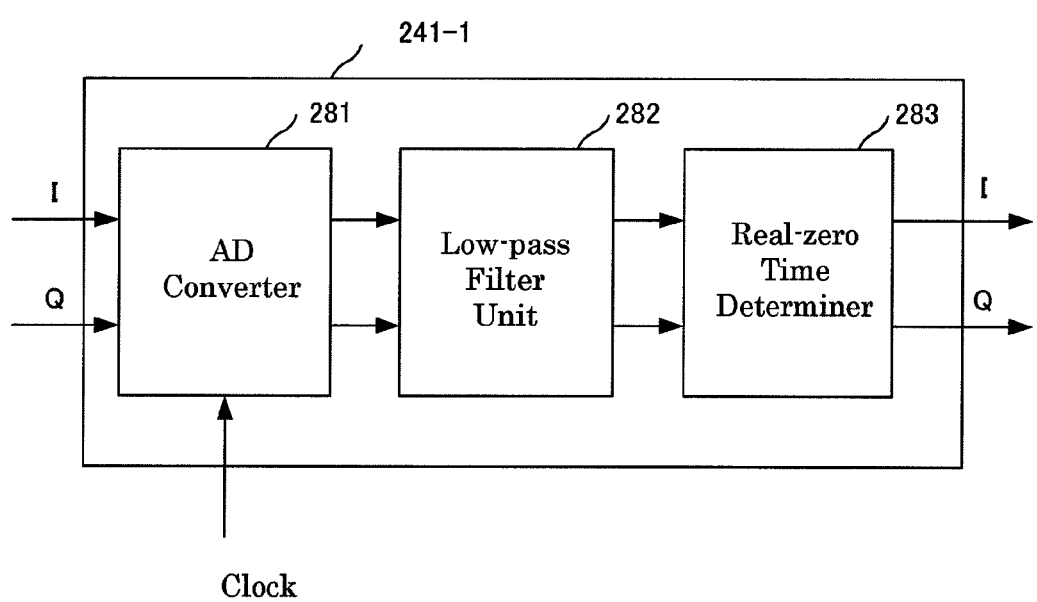
[FIG. 14] is a diagram for illustrating a configuration of a zero-cross time calculator in the first embodiment.

FIG. 14 is a schematic block diagram showing another configuration of zero-cross time calculator 241. Zero-cross time calculator 241-1 includes an AD converter 281, a low-pass filter unit 282 and a real-zero time determinator 283.

AD converter 281 converts in-phase component vi(t) and quadrature component vq(t) input from in-phase and quadrature component detector 206, from analog to digital signals. In this case, amplifiers 237-1 and 237-2 perform amplification, approximately preserving zero-cross waveforms of the analog waveforms in low-pass filter units 234-1 and 234-2. As to in-phase component vi(t) and quadrature component vq(t), the amplitude of the signals is amplified approximately linearly when the level is around 0, it is hence possible to make the input range of AD converter 281 narrower than that of the prior art. AD converter 281 is to calculate the time points when the in-phase component vi(t) and quadrature component vq(t) cross zero, hence may be an AD converter that quantizes rougher than the AD conversion in the prior art. As a result, it is possible to reduce the power consumption of the receiver apparatus.

Low-pass filter unit 282 is a digital filter that performs linear interpolation so as to smoothen the in-phase component and quadrature component that have been discretized by AC converter 281. Real-zero time determiner 283 calculates the time points at which in-phase component and quadrature component become zero, from the signal input from low-filter unit 282.

Figure 15:
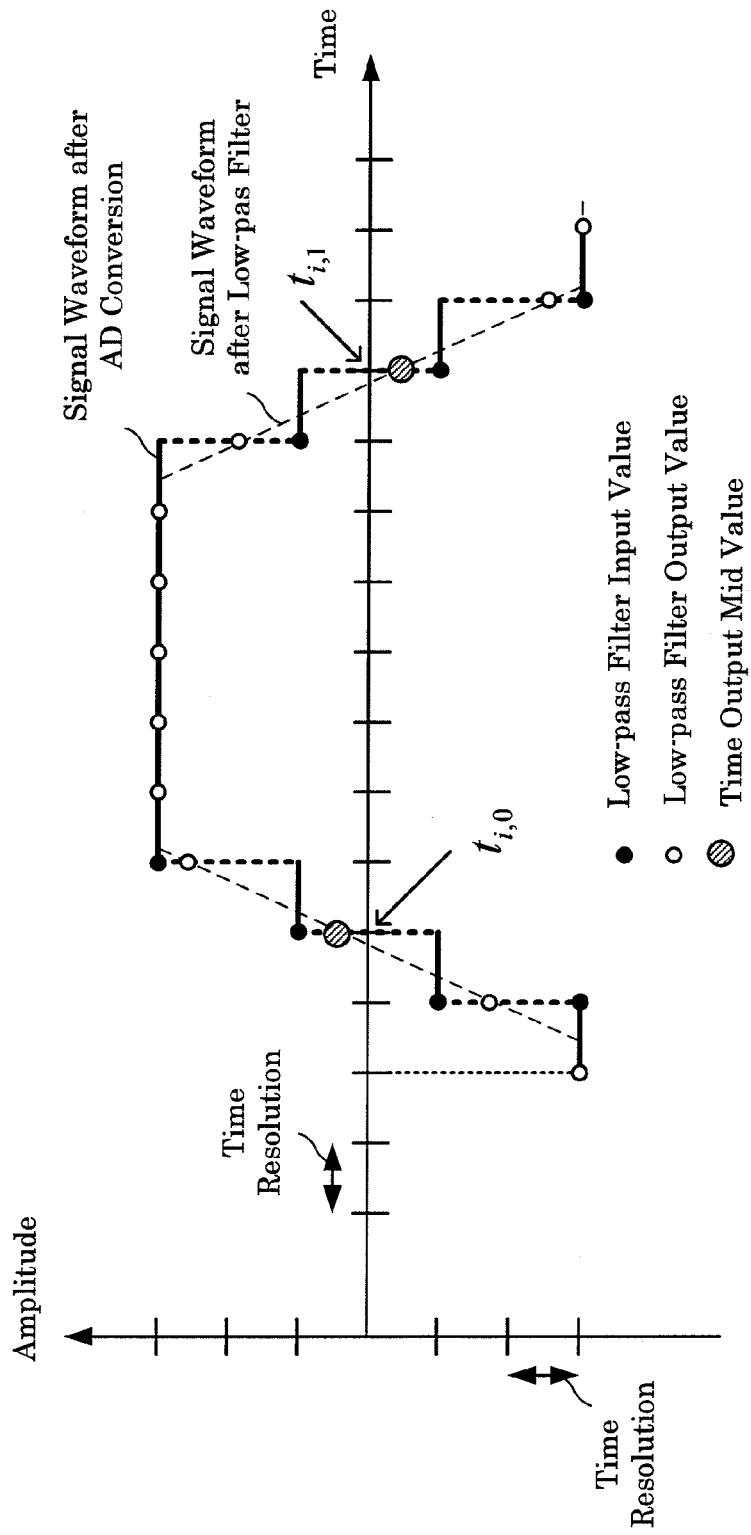
[FIG. 15] is a diagram for illustrating an operational principle in the first embodiment.

FIG. 15 shows a signal when the output signal from AD converter 281 is linearly interpolated by low-pass filter unit 282 until a sequence (real-zero sequence) of time points at which the signal takes a real zero is calculated. FIG. 15 is an example when the in-phase component signal is input.

AD converter 281 quantizes the in-phase component vi(t) input from in-phase and quadrature component detector 206, based on the input clock and outputs in-phase component values indicated by the black round in FIG. 15. Low-pass filter unit 282 performs linear interpolation based on the in-phase component values and outputs in-phase component values indicated by the white round in FIG. 15. That is, the stepped waveform represented by the solid line in FIG. 15 is shaped into a waveform indicated by the broken line in FIG. 15.

Real-zero time determiner 283 outputs time points ti0 and ti1 at which the in-phase component value(the in-phase component value indicated by the hatch in FIG. 15) is close to zero, among the in-phase component values shown by the white round in FIG. 15.

As described above, by using AD conversion with rough precision, it is possible for zero-cross time calculator 241-1 to perform zero cross time calculation with high precision even when a relatively low-rate clock such as a crystal oscillator or the like is used as clock generator 242.

Figure 16:
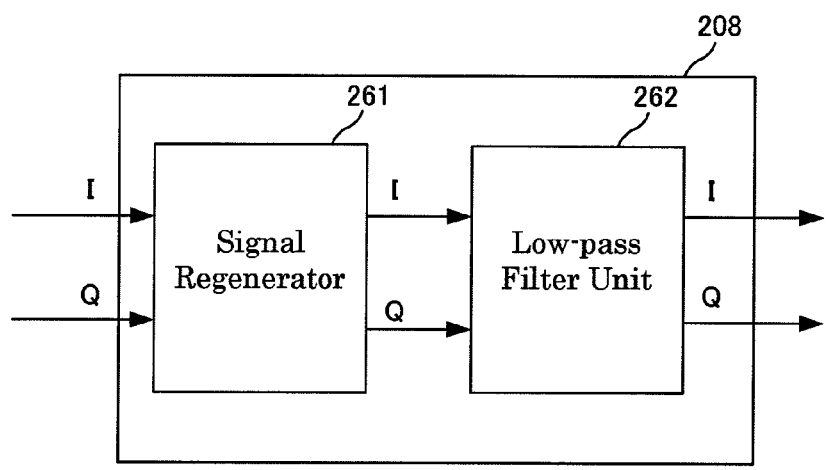
[FIG. 16] is a diagram for illustrating a configuration of a signal reconstruction unit in the first embodiment.

Returning to FIG. 4, signal reconstruction unit 208 reconstructs in-phase component iz(t) and quadrature component qz(t) from in-phase component zero-cross sequence τi and quadrature component zero-cross sequence τq. FIG. 16 is a schematic block diagram showing a configuration of signal reconstruction unit 208. As shown in FIG. 16, signal reconstruction unit 208 includes a signal regenerator 261 and low-pass filter unit 262.

When receiving in-phase component zero-cross sequence τi and quadrature component zero-cross sequence τq, signal regenerator 261 reproduce in-phase component î_z(t) and quadrature component q̂_z(t), by the operations of the following expressions (22) and (23).

[Math 22]

$$\hat{i}_z(t) = A_0 2^{2M-1} \prod_{m_i=1}^{2M} \sin[\pi f_0(t - t_{i,m_i})] \quad (22)$$

[Math 23]

$$\hat{i}_q(t) = A_0 2^{2M-1} \prod_{m_q=1}^{2M} \sin[\pi f_0(t - t_{q,m_q})] \quad (23)$$

Here, A0 is an unfixed constant. M is the number of times of sampling and sampling interval T is T=M/fm.

Low-pass filter unit 262 removes the sinusoidal wave added for real-zero calculation, from the in-phase component î_z(t) and quadrature component q̂_z(t) output from signal regenerator 261 to extract in-phase component i(t) and quadrature component q(t) of the transmission signal. That is, the component of frequency fm is removed in the above expressions (15) and (16). As a method of removing the component of frequency fm, removal can be realized by performing Fourier transformation of the in-phase component î_z(t) and quadrature component q̂_z(t), removing the frequency fm and then performing inverse-Fourier transformation, instead of using a low-pass filter.

Returning to FIG. 4, demodulator 209 demaps the digital signals of the in-phase component and quadrature component output from signal reconstruction unit 208 to calculate channel-coded data bits. Decoder 210 performs error decoding correction on the channel-coded data bits to output data bits.

Though, in the receiver apparatus of the present embodiment, the function of adjusting the signal power or amplitude (gain control amplifier 204) is arranged at the previous stage of real-zero signal generator 205, this may be arranged at the subsequent stage of real-zero signal generator 205. For example, it is possible to realize a gain control function of adjusting the signal power or amplitude to amplifier 231 of in-phase and quadrature component detector 206. As a result, it is possible to adjust the degree of non-linear distortion of the signal.

Further, in the receiver apparatus of the present embodiment, reference signal generator 222 of real-zero signal generator 205 and signal generator 235 of in-phase and quadrature component detector 206 generate signals separately. However, it is possible to generate two reference signals by frequency multiplication of the signal which a single signal generator outputs as the reference for the aforementioned two reference signal generators.

It is also preferable that reference signal generator 222 and signal generator 235 have frequencies of integer multiples of a predetermined common frequency. For example, as the single signal generator to be the reference of the two reference signal generator, a PLL frequency synthesizer (Phase Locked Loop frequency synthesizer) or the like can be applied.

Further, though, in the present embodiment, a sinusoidal wave is added as a reference signal to the modulated wave, this is not a requisite as long as real-zero sequences can be generated.

As above, according to the communication system of the first embodiment, when receiving the quadrature-modulated signal that was transmitted based on a single carrier transmission scheme, the receiver apparatus generates a real-zero signal by adding a sinusoidal wave to the received signal, performs frequency conversion and in-phase and quadrature phase detection using the generated real-zero signal, then perform time-digital conversion to thereby reproduce in-phase component and phase component. That is, time points (real zero) at which the in-phase component and phase component become zero are used to reproduce the in-phase component and phase component. As a result, it is possible to suppress degradation of data decoding accuracy even when linearity cannot be maintained, hence causing waveform distortion in the analog circuit of the receiver apparatus. Further, in the communication system of the present embodiment, it is possible to operate the analog circuit with low voltage, hence power consumption can be suppressed to a low level.

Though description of the communication system of the present embodiment was made on a case where the quadrature-modulated, modulated waves are exchanged based on a single carrier transmission scheme, it is also possible to use a multi-carrier transmission scheme such as OFDM (Orthogonal Frequency Domain Multiplexing) or the like. When the quadrature-modulated, modulated waves are exchanged using OFDM, it is possible for the transmitter apparatus to generate as many quadrature-modulated, modulated waves as the number of subcarriers and generate by performing IFFT processing on the quadrature-modulated, modulated waves. In receiver apparatus 200, the output signal from signal reconstruction unit 208 is subjected to FFT processing, and the in-phase component and quadrature component of the sub-carrier signals to which modulated waves have been allotted by the transmitter apparatus are extracted from the signal after FFT processing and input to demodulator 209.

Further, though receiver apparatus 200 of the present embodiment was illustrated by taking a configuration using zero IF (Low-IF), the invention is not limited to this but can be applied to a super heterodyne method or the like that performs in-phase and quadrature component detection by down-converting the received signal to an intermediate frequency (IF). In this case, real-zero signal generator 205 can be arranged in either RF or IF.

[The Second Embodiment]

Next, the second embodiment will be described. The communication system described in the second is an embodiment in which a variational receiver apparatus is applied to the communication system of the first embodiment. In this case, the transmitter apparatus in the second embodiment is the same as transmitter apparatus 100 described in the first embodiment.

Figure 17:
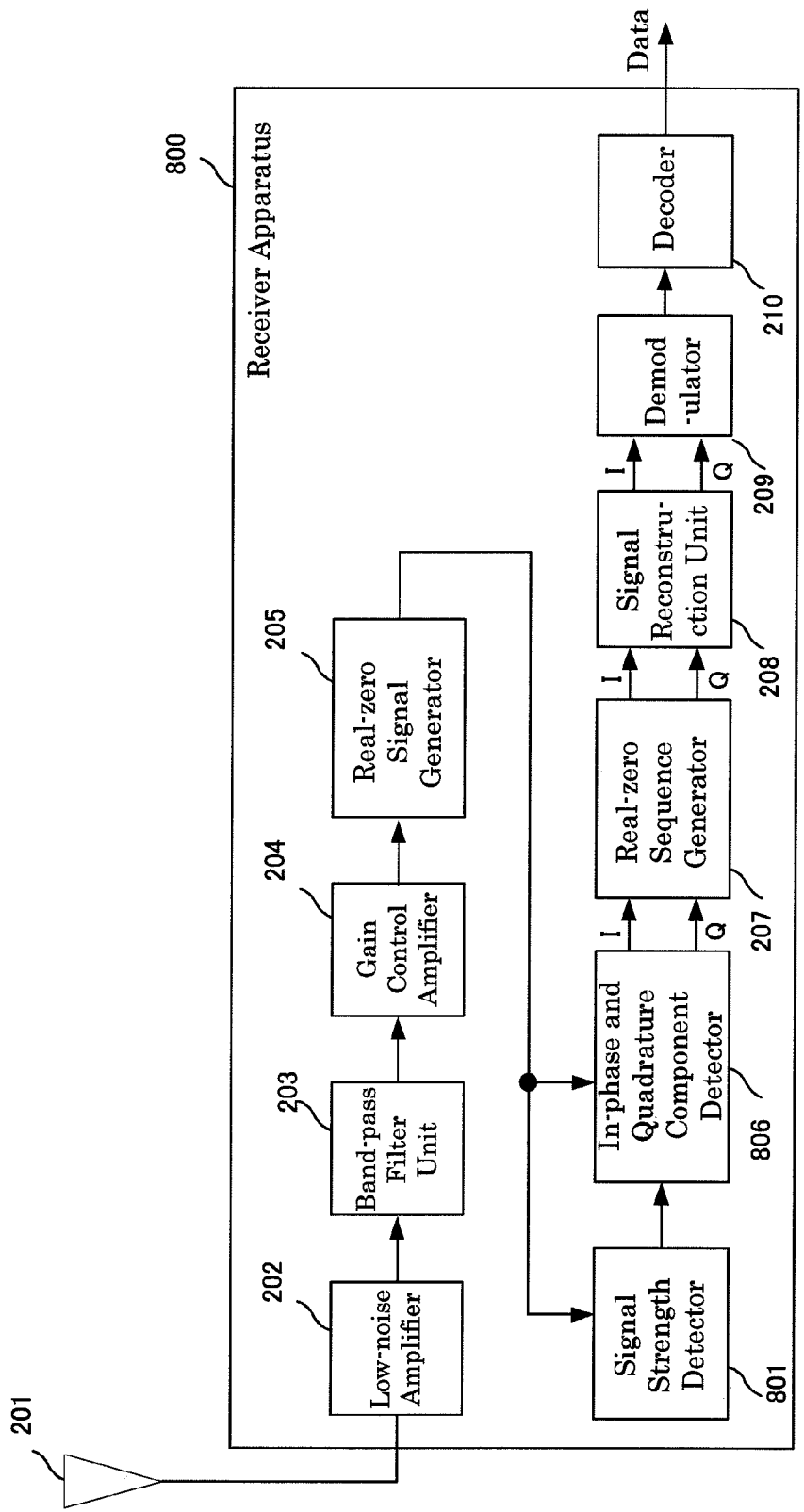
[FIG. 17] is a diagram for illustrating a configuration of a receiver apparatus in the second embodiment.

FIG. 17 shows a schematic block diagram of a configuration of a receiver apparatus 800 in the second embodiment. As illustrated, receiver apparatus 800 includes a low-noise amplifier 202, a band-pass filter unit 203, a gain control amplifier 204, a real-zero signal generator 205 (reference signal adder), a signal strength detector 801, an in-phase and quadrature component detector 806, a real-zero sequence generator 207, a signal reconstruction unit 208, a demodulator 209 and a decoder 210, and is connected to an antenna unit 201.

The difference from the receiver apparatus 200 of the first embodiment resides in inclusion of in-phase and quadrature component detector 806 instead of in-phase and quadrature component detector 206 and further inclusion of signal strength detector 801. Now, description will be made focusing on the components different from the first embodiment.

Signal strength detector 801 (RSSI unit) measures the signal strength value of the signal input from real-zero signal generator 205. Then, the measured signal strength value is output to in-phase and quadrature component detector 806.

In-phase and quadrature component detector 806 extracts the in-phase component (real number component, I-component) and quadrature component (imaginary number component, Q-component) from real-zero signal rz(t) input from real-zero signal generator 205 and corrects the in-phase component and quadrature component based on the received electric field strength of the real-zero signal.

Figure 18:
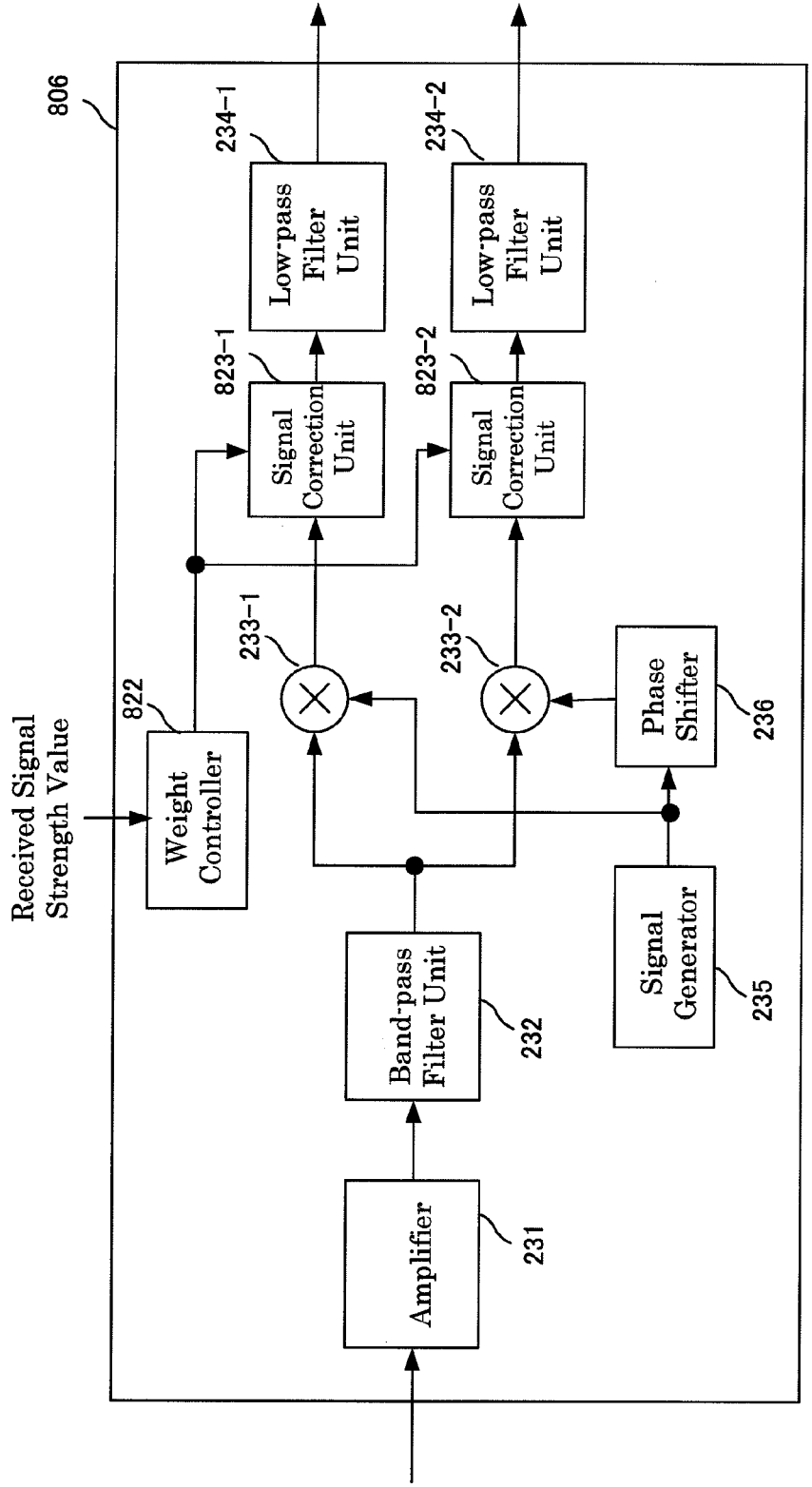
[FIG. 18] is a diagram for illustrating a configuration of an in-phase and quadrature component detector in the second embodiment.

FIG. 18 is a schematic block diagram showing a configuration of in-phase and quadrature component detector 806. In-phase and quadrature component detector 806 includes an amplifier 231, a band-pass filter unit 232, multipliers 233-1 and 233-2, low-pass filter units 234-1 and 234-2, a signal generator 235, a phase shifter 236, a weight controller 822 and signal correction units 823-1 and 823-2.

Weight controller 822 calculates a weight coefficient based on the signal strength value output from signal strength detector 801. Signal correction unit 823-1 corrects the in-phase component signal output from multiplier 233-1, using the weight coefficient. Also, signal correction unit 823-2 corrects the quadrature component signal output from multiplier 233-2, using the weight coefficient.

Next, one example of performing signal correction using weight coefficients based on a signal strength value will be described. The following expressions (24) and (25) show one example where signal strength detector 801 detects the signal strength of input real-zero signal rz(t). In expression (24), the average of the signal that is obtained by amplifying the square-law detected value of real-zero signal rz(t) by a logarithm amplifier is calculated over a predetermined period $T_N$, and the output value of the exponential function on the average value is regarded as the power value. In expression (25), the logarithm of the average of the square-law detected value of real-zero signal rz(t) is calculated over a predetermined period $T_N$, and the output value of the exponential function on the legalism value is regarded as the power value. Though expressions (24) and (25) use square-law detection, full-wave rectifying detection may be used to calculator the power.

[Math 24]

$$w_i(t) = \exp\left\{\frac{1}{N}\sum_{-N/2}^{N/2} \log[r_z^2(t+i\Delta t)]\right\} \quad (24)$$

[Math 25]

$$w_2(t) = \exp\left\{\log\left[\frac{1}{N}\sum_{-N/2}^{N/2} r_z^2(t+i\Delta t)\right]\right\} \quad (25)$$

Weight controller 822 calculates a weight coefficient using the signal strength value input from the signal strength detector 801. The following expression (26) is one example of calculating a weight coefficient from the signal strength value from expression (24) or expression (25). Weight controller 822 outputs a greater weight coefficient as the signal strength value is greater.

[Math 26]

$$w_1(t) = A_r\sqrt{w_a(t)} \quad (26)$$

Here, $T_N = N\Delta t$ (N is an arbitrary integer), a=1, 2, and Ar is a predetermined coefficient.

Signal correction unit 823-1 multiplies the in-phase component signal output from multiplier 233-1 by the weight coefficient to correct the signal. Signal correction unit 823-2 multiplies the in-phase component signal output from multiplier 233-2 by the weight coefficient to correct the signal.

The in-phase component or quadrature component signal corrected by signal correction unit 823-1 or signal correction unit 823-2 is processed through low-pass filter unit 234-1 or low-pass filter unit 234-2 to remove unnecessary higher harmonics, then the resultant signal is output from in-phase and quadrature component detector 806 to generate a real-zero sequence in real-zero sequence generator 207.

As described, the in-phase component signal and quadrature component signal extracted from the real-zero signal are weighted based on the signal strength of the input real-zero signal, whereby it is possible to improve the accuracy of the zero-cross time sequences of the in-phase component and quadrature component, generated by real-zero sequence generator 207.

Though the present embodiment was described referring to a case where signal correction based on the signal strength is applied to in-phase and quadrature component detector 206 using a multiplication type detecting method, application may be made to in-phase and quadrature component detector 206-1 using a logical-sum type detecting method.

[The Third Embodiment]

Next, the third embodiment will be described. The communication system in the third embodiment includes a transmitter apparatus that transmits a quadrature-modulated (IQ-modulated) signal of channel-coded data bits that have been quadrature-modulated by PSK (Phase Shift Keying), QAM (Quadrature Amplitude Modulation) or the like and a real-zero reference signal and a receiver apparatus that receives the signal output from the transmitter apparatus, the receiver apparatus regenerating the in-phase and quadrature components using real-zero sequences.

Figure 19:
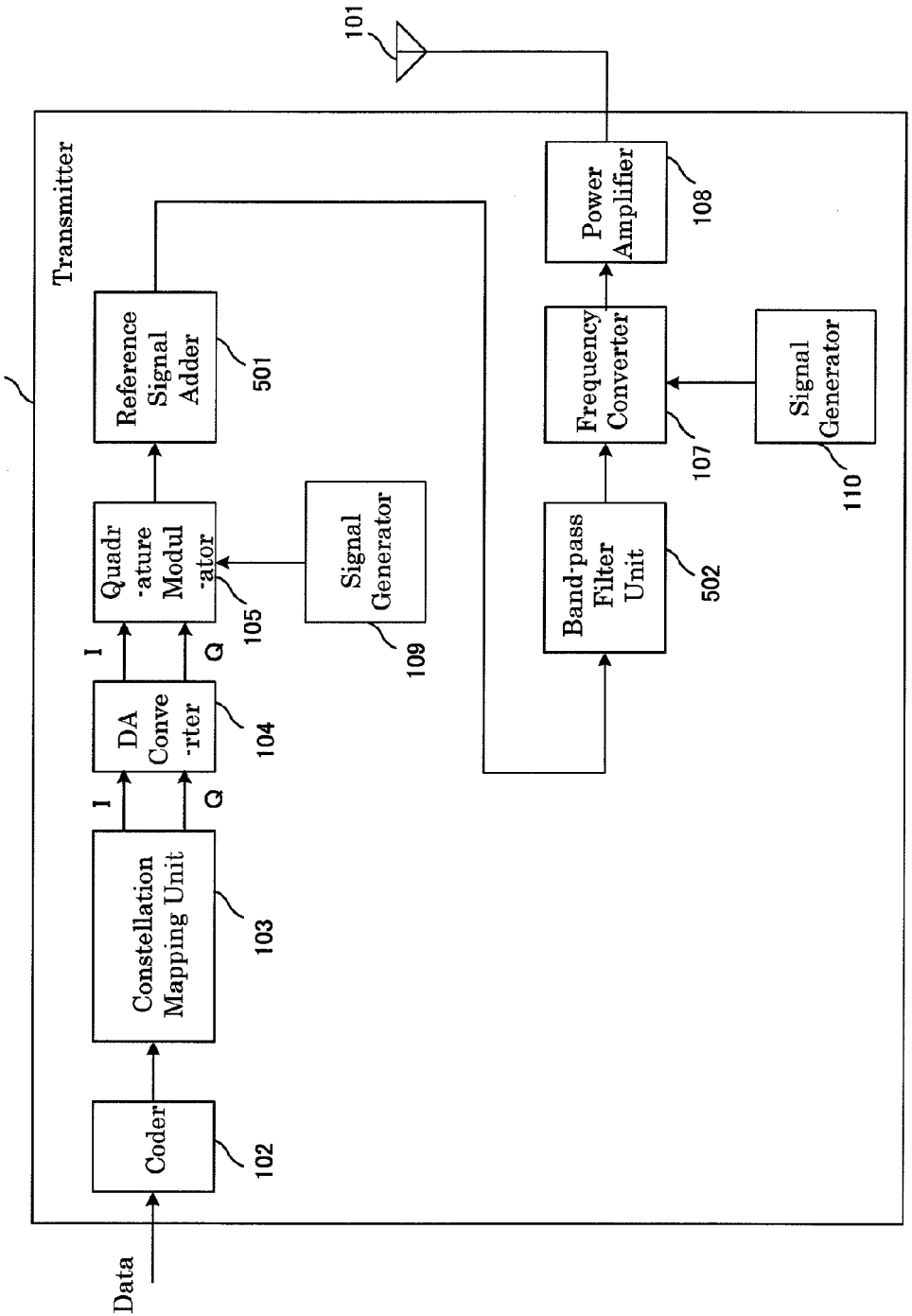
[FIG. 19] is a diagram for illustrating a configuration of a transmitter apparatus in the third embodiment.

FIG. 19 is a schematic block diagram of a configuration of a transmitter apparatus 500 in the third embodiment. Transmitter apparatus 500 includes an encoder 102, a constellation mapping unit 103, a DA converter 104, a quadrature modulator 105, a reference signal adder 501, a band-pass filter unit 502, a frequency converter 107, a power amplifier 108, a first local signal generator 109 and a second local signal generator 110, and is connected to antenna unit 101. That is, the difference of transmitter apparatus 500 in the present embodiment from transmitter apparatus 100 resides in inclusion of reference signal adder 501, and inclusion of band-pass filter unit 502 instead of band-pass filter unit 106. Now, description will be made focusing on the different components.

Reference signal adder 501 adds a sinusoidal wave to the modulated wave output from quadrature modulator 105. Reference signal adder 501 has the same configuration as that of real-zero signal generator 205. The sinusoidal wave ra(t) (reference signal) added to the modulated wave output from quadrature modulator 105 is preferably set so as to have an amplitude Au that satisfies the following expression (27). Denoted as e(t) is a complex envelop of the modulated wave output from quadrature modulator 105.

[Math 27]

$$A_u > \max |e(t)| \qquad (27)$$

$$e(t) = a(t) e^{j\phi(t)}$$

The frequency fa of sinusoidal wave ra(t) added to the modulated wave output from quadrature modulator 105 is set so as to satisfy fa<fb1−fm and fa>fb1+fm (the modulated wave band width 2×fm).

Figure 20:
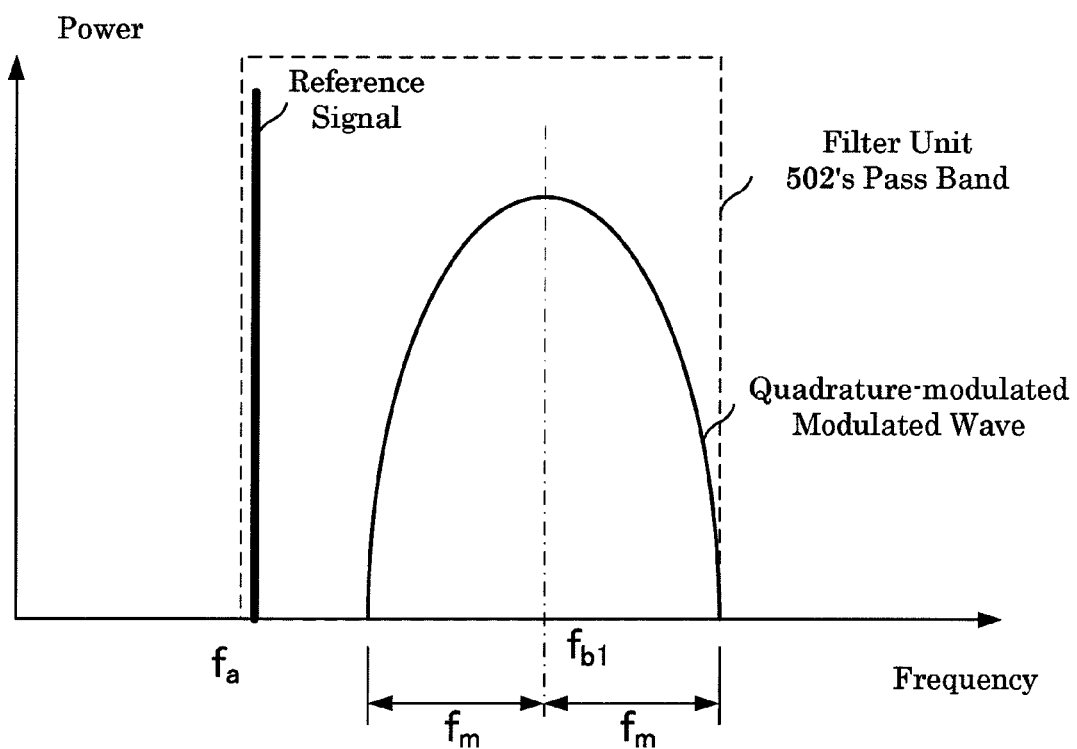
[FIG. 20] is a diagram showing an operational principle in the third embodiment.

Band-pass filter unit 502 removes out-of-band radiation from the signal output from reference signal adder 501 and extract the modulated wave of the desired band including the center frequency and sinusoidal wave ra(t). FIG. 20 shows a signal output from band-pass filter unit 502 when sinusoidal wave ra(t) that satisfies fa<fb1−fm is added at reference signal adder 501.

The output signal from band-pass filter unit 502 is up-converted by frequency converter 107 to the carrier frequency band fc, and then amplified by power amplifier 108 to the desired transmission signal power. A signal s(t) transmitted from antenna unit 101 is represented by the following expression.

[Math 28]

$$s(t) = A_{pa}(a(t)\cos[2\pi f_c t + \phi(t)] + Au \cos[2\pi f_a t + \phi_a]) \qquad (28)$$

Apa is the total gain from the low-pass filter unit up to the power amplifier.

Further, the complex representation of the signal s(t) transmitted from antenna unit 101 is given by the following expression (29).

[Math 29]

$$s(t) = \Re[e_z(t) e^{j2\pi f_c t}] \qquad (29)$$

$$e_z(t) = A_{pa}(e(t) + A_u e^{j(2\pi f_m t + \phi_a)})$$

Though, in the above transmitter apparatus 500, the reference signal is added to the modulated wave when in the intermediate frequency band (IF band), the reference signal may be added after when the modulated wave has been up-converted to the carrier frequency band (radio frequency band, RF band). This can be realized by arranging reference signal adder 501 at the subsequent stage of frequency converter 107 and setting the reference signal frequency fa so as to satisfy fa<fc−fm and fa>fc+fm.

Figure 21:
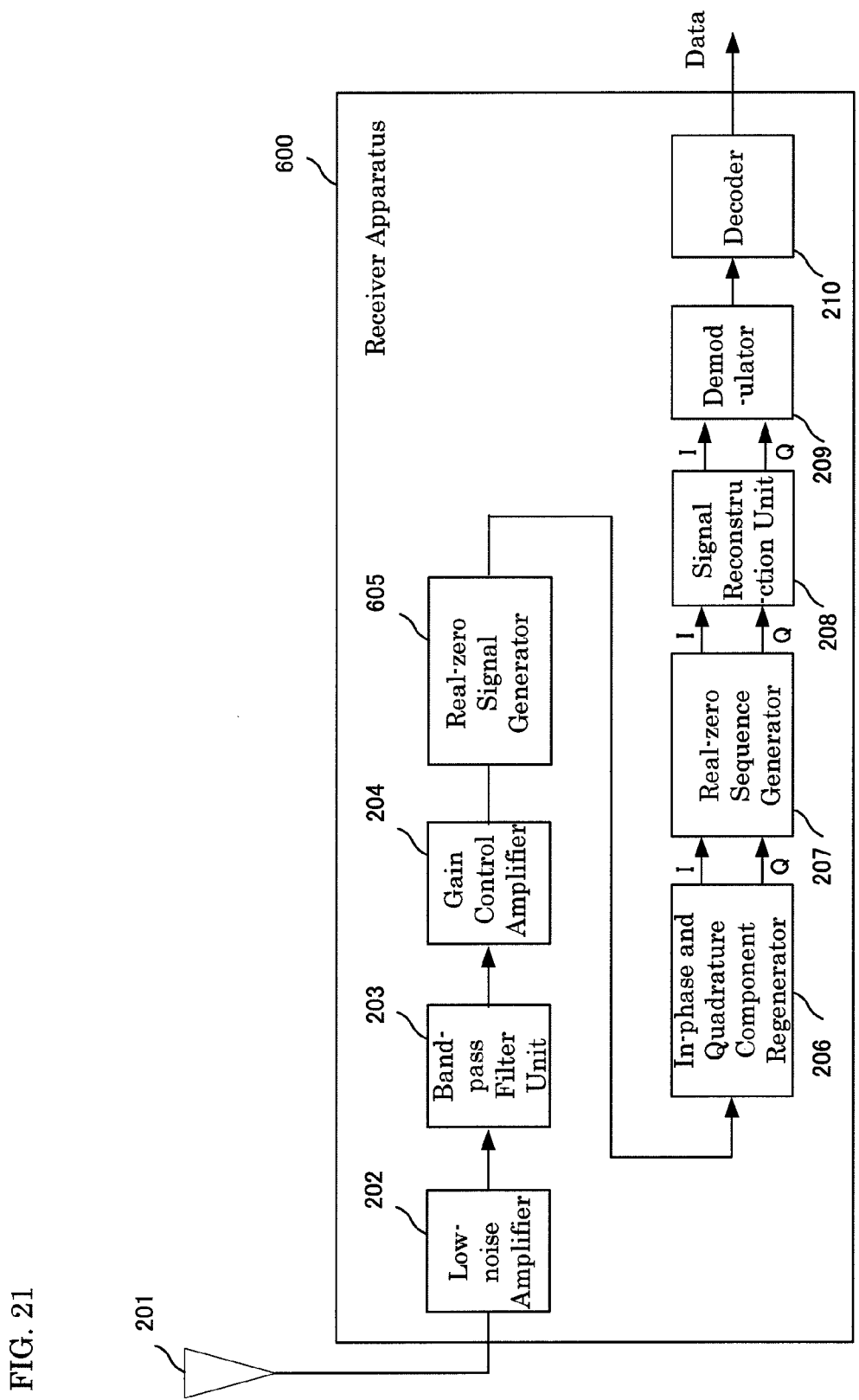
[FIG. 21] is a diagram for illustrating a configuration of a receiver apparatus in the third embodiment.

FIG. 21 is a schematic block diagram showing a configuration of a receiver apparatus 600 in the present embodiment. As illustrated, receiver apparatus 600 includes a low-noise amplifier 202 (LNA: Low Noise Amplifier), a band-pass filter unit 203, a gain control amplifier 204, a real-zero signal generator 605, an in-phase and quadrature component detector 206, a real-zero sequence generator 207, a signal reconstruction unit 208, a demodulator 209 and a decoder 210, and is connected to an antenna unit 201. Here, the difference of receiver apparatus 600 from receiver apparatus 200 is that real-zero signal generator 605 is provided instead of real-zero signal generator 205.

Receiver apparatus 600 receives a signal consisting of a quadrature-modulated, modulated wave and a reference signal (sinusoidal wave ra(t) added at the transmitter apparatus) from transmitter apparatus 500, amplifies the signal through low-noise amplifier 202 and removes the out-of-band signals by band-pass filter unit 203. Band-pass filter unit 203 has a pass bandwidth that permits the quadrature-modulated, modulate wave and reference signal to pass.

Figure 22:
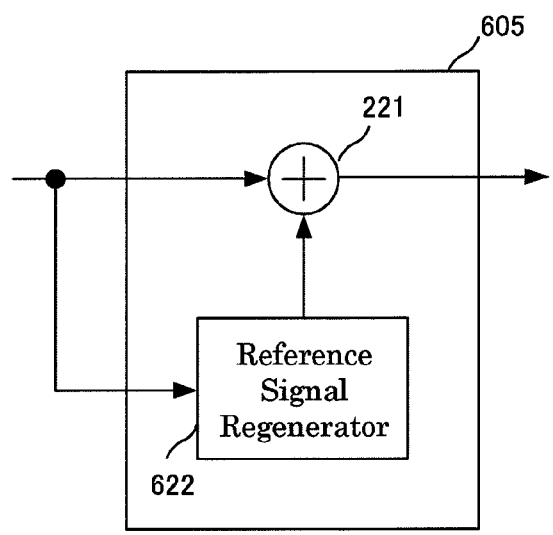
[FIG. 22] is a diagram for illustrating a configuration of a receiver apparatus in the third embodiment.

Real-zero signal generator 605 generates a real-zero signal by adding a sinusoidal wave to the signal input from gain control amplifier 204. FIG. 22 is a schematic block diagram showing a configuration of real-zero signal generator 605. Real-zero signal generator 605 includes an adder 221 and a reference signal regenerator 622. Reference signal regenerator 622 extracts the reference signal from the modulated signal and reference signal input from gain control amplifier 204, extracts the reference signal and amplifies the signal to reproduce the reference signal. The reproduced reference signal is set up so as to have an amplitude Au that satisfies the above expression (27).

Adder 221 adds the signal input from gain control amplifier 204 to the signal input from reference signal regenerator 622. This enables generation of a real-zero signal even when the reference signal collapses due to channel frequency-selective fading. Also, the amplitude of the reference signal to be added at reference signal adder 501 in transmitter apparatus 500 can be set at a low level, hence it is possible to suppress power loss of the transmission signal due to addition of the reference signal. Here, it is also possible to omit real-zero signal generator 605 when the signal received by receiver apparatus 600 satisfies expression (27).

The output signal from band-pass filter unit 203 is adjusted as to signal power to be detectable by gain control amplifier 204 and in-phase and quadrature component detector 206, then in-phase and quadrature component detection is performed.

As above, according to the communication system of the third embodiment, the transmitter apparatus transmits a signal (real-zero signal) composed of a quadrature-modulated, modulated wave added with a sinusoidal wave to be the reference signal of real zero. The receiver apparatus performs frequency conversion and in-phase and quadrature phase detection using the generated real-zero signal, then reproduces the in-phase component and phase component, using the time points (real zero) at which the in-phase component and phase component become zero. As a result, it is possible to suppress degradation of data decoding accuracy even when linearity cannot be maintained and waveform distortion occurs in the analog circuits of the transmitter apparatus and receiver apparatus. Further, in the communication system of the present embodiment, it is possible to operate the analog circuit with low voltage, hence power consumption can be reduced to a low level.

[The Fourth Embodiment]

Next, the fourth embodiment will be described. The communication system in the fourth embodiment includes a transmitter apparatus that transmits a quadrature-modulated (IQ-modulated) signal of channel-coded data bits that have been quadrature-modulated by PSK (Phase Shift Keying), QAM (Quadrature Amplitude Modulation) or the like and a receiver apparatus that receives the signal output from the transmitter apparatus, the receiver apparatus reproducing the in-phase and quadrature components using real-zero sequences. The following description will be made using a case where an OFDM transmission scheme (Orthogonal Frequency Domain Multiplexing) is used as a multi-carrier transmission scheme.

Figure 23:
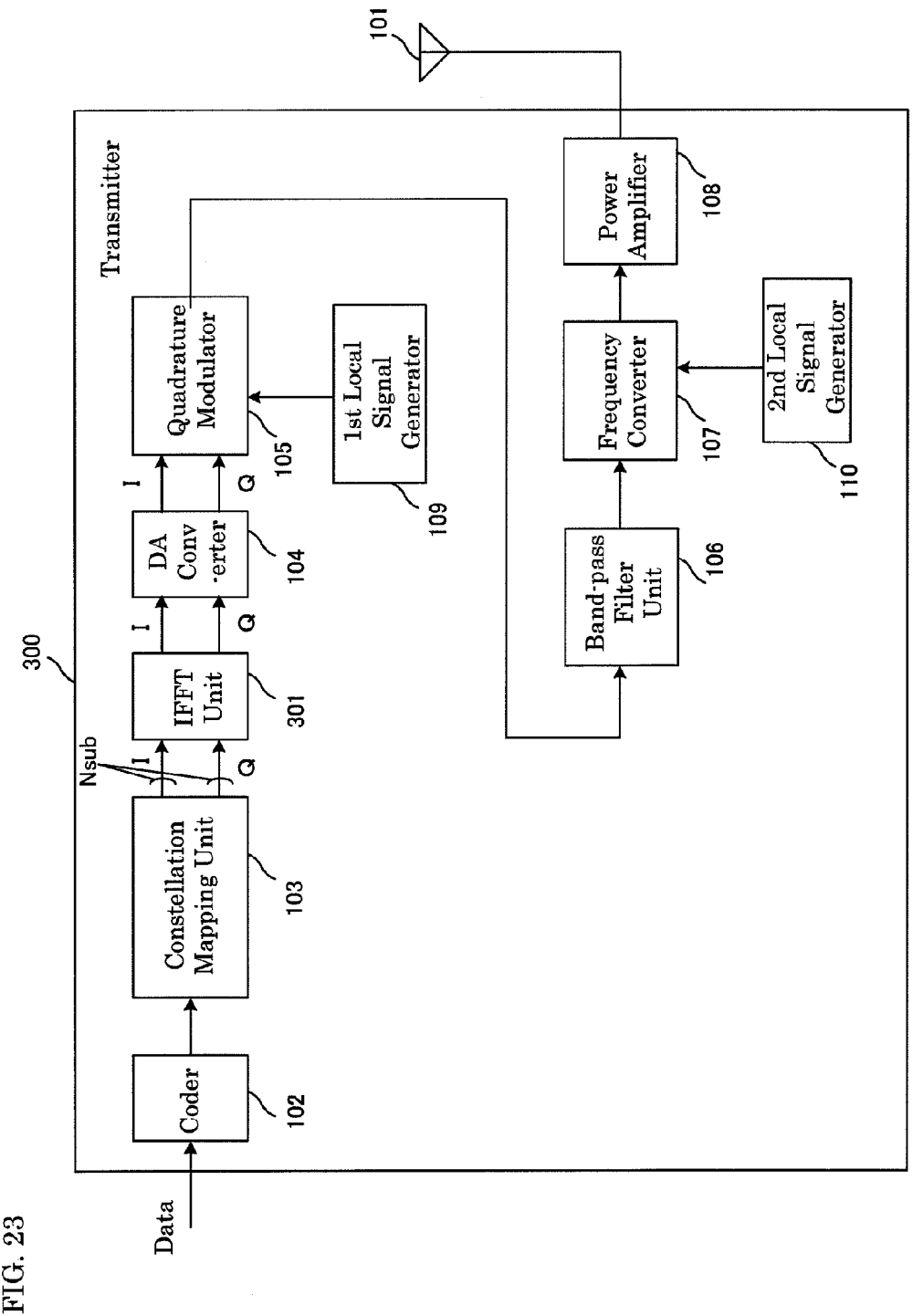
[FIG. 23] is a diagram for illustrating a configuration of a transmitter apparatus in the fourth embodiment.

FIG. 23 is a schematic block diagram showing a configuration of a transmitter apparatus 300 in the fourth embodiment. Transmitter apparatus 300 includes the encoder 102, a constellation mapping unit 103, an IFFT unit 301, a DA converter 104, a quadrature modulator 105, a band-pass filter unit 106, a frequency converter 107, a power amplifier 108, a first local signal generator 109 and a second local signal generator 110, and is connected to antenna unit 101. The difference of transmitter apparatus 300 from transmitter apparatus 100 of the first embodiment is inclusion of IFFT unit 301. Now, description will be made focusing on the different component.

Constellation mapping unit 103 maps the coded bits input from encoder 102 onto the in-phase component (real number component, I) and the quadrature component (imaginary number component, Q), based on the number of multilevel modulation and the mapping rule of the number of multilevel modulation (e.g., FIG. 2) and outputs in-phase component values and quadrature component values. Further, constellation mapping unit 103 generate as many number of in-phase component values and quadrature component values as the number of subcarriers of OFDM modulation and outputs them to IFFT unit 301.

IFFT unit 301 maps the in-phase component values and quadrature component values input from constellation mapping unit 103 onto any of as many inputs as the number of IFFT points, and converts the signal from the frequency domain to time domain by IFFT processing. When in-phase component value ik and quadrature component value qk (an integer of 0≤k≤Nsub−1) are input, Nsub number of ik+j·qk (j is an imaginary number) are mapped onto the input of the IFFT unit, and IFFT processing is performed so as to output in-phase component and quadrature component signals that have been transformed into time domain.

The output signal from IFFT unit 301 is converted by DA converter 104 from digital signal to analog signal. Then, in quadrature modulator 105, the resultant is multiplied by the carrier wave input from first local signal generator 109 so as to be quadrature-modulated. Thereafter, the signal is subjected to the same processing as in transmitter apparatus 100 of the first embodiment, and is transmitted to antenna 101. The transmission signal s(t) of transmitter apparatus 300 is given by the following expression (30).

[Math 30]

$$s(t) = \sqrt{P} \sum_{k=-M}^{M} c_k e^{j2\pi f_k t} \tag{30}$$

$$f_k = f_c + \frac{k}{2T_s}$$

Here, fk is the frequency of the k-th subcarrier, fc is the carrier wave frequency, Ts is the OFDM symbol interval, P is the transmission power, M=Nsub/2, Ck is jk=jk+j·qk, which represents the in-phase component and quadrature component input from constellation mapping section 103 (where i0+jq0=0. That is, no mapping is performed on to the DC component).

The complex envelop e(t) in the first embodiment is that obtained by mapping the predetermined Ck calculated from the coded bits onto the phase of one sinusoidal wave and this is equivalent to mapping onto a plurality of sinusoidal waves having Ck at intervals of a fixed frequency in the present embodiment.

Figure 24:
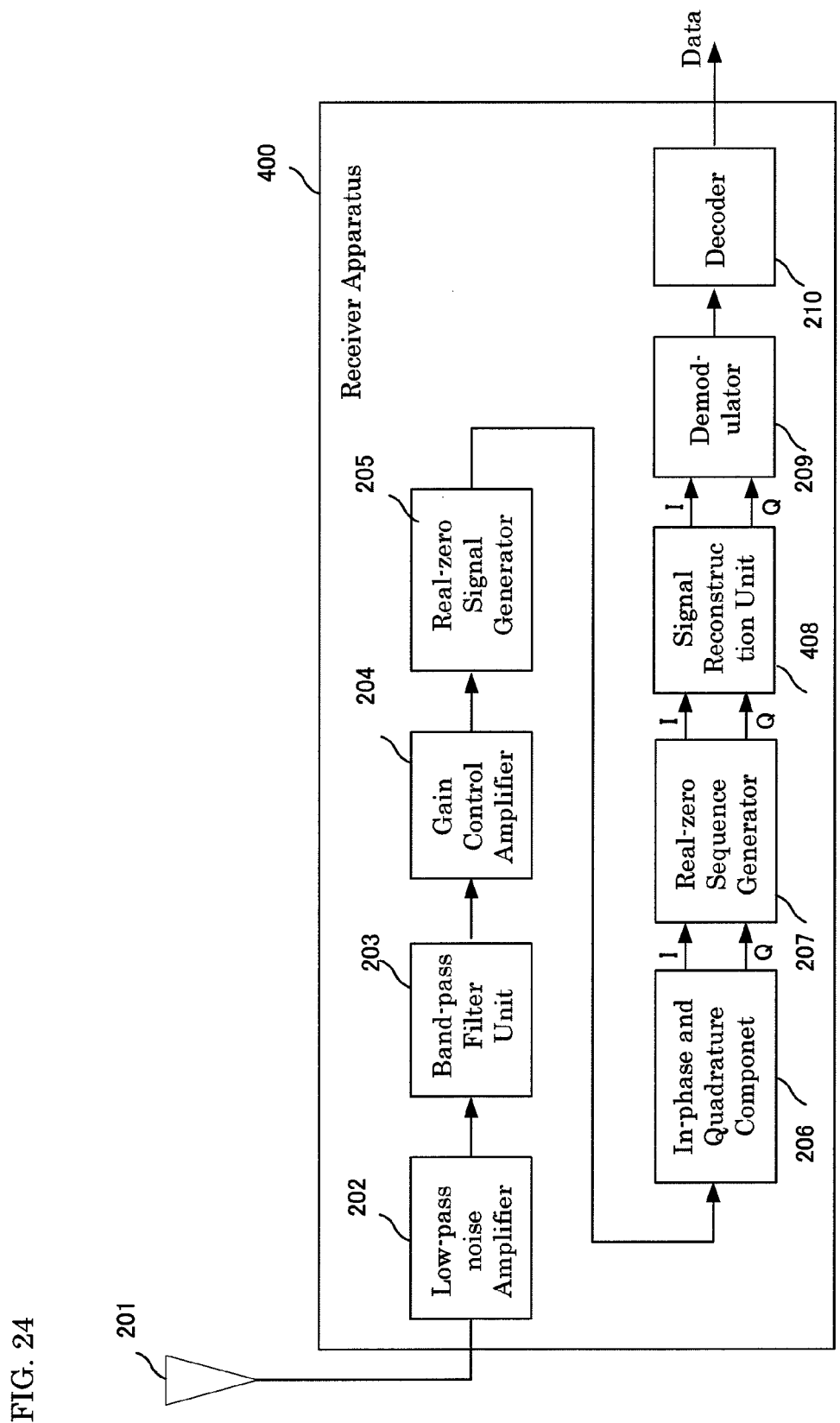
[FIG. 24] is a diagram for illustrating a configuration of a receiver apparatus in the fourth embodiment.
Figure 25:
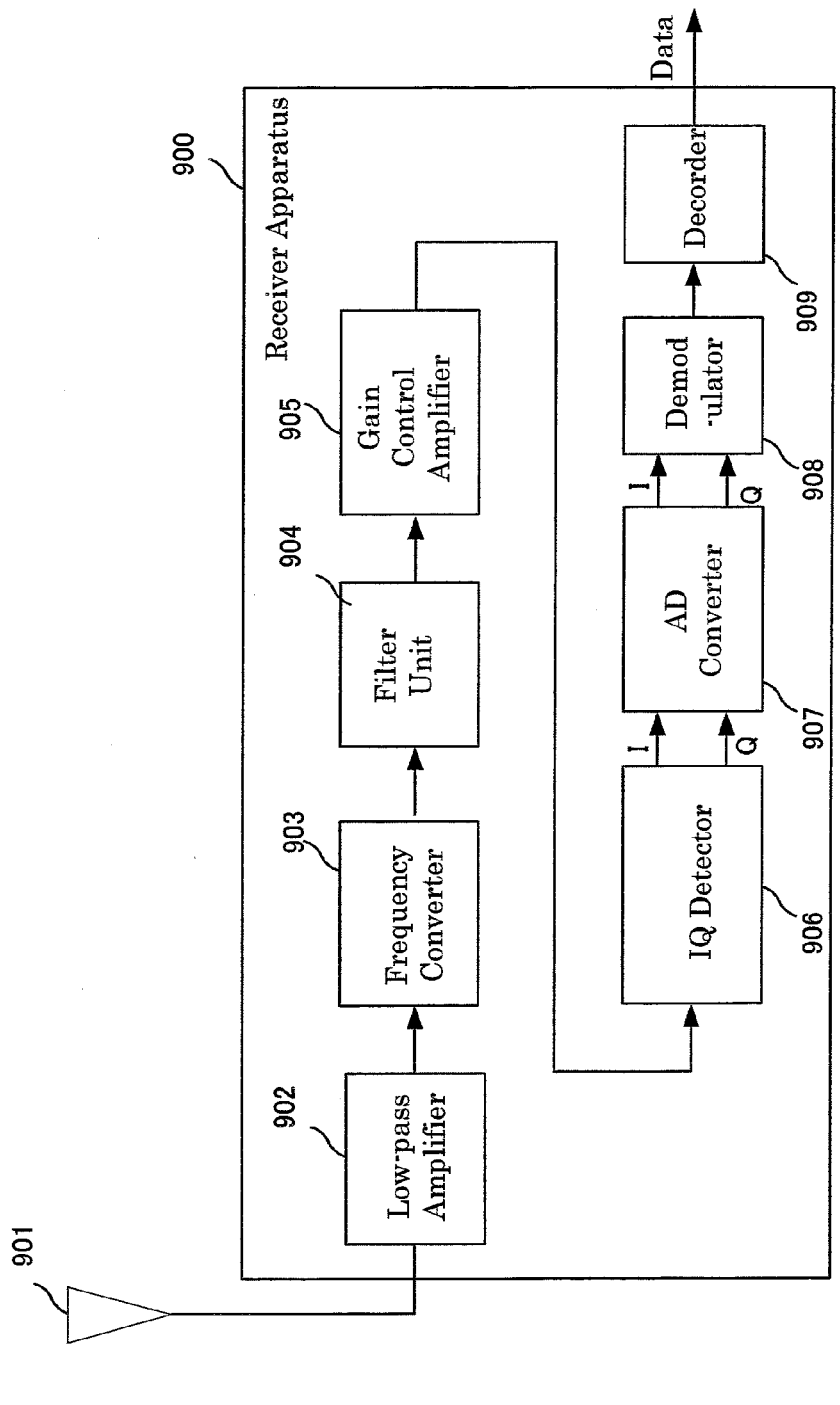
[FIG. 25] is a diagram for illustrating the prior art.

Next, FIG. 24 is a schematic block diagram showing a configuration of a receiver apparatus 400 in the present embodiment. As illustrated, receiver apparatus 400 receives the signal transmitted from transmitter apparatus 300 and includes a low-noise amplifier 202 (LNA: Low Noise Amplifier), a band-pass filter unit 203, a gain control amplifier 204, a real-zero signal generator 205 (reference signal adder), an in-phase and quadrature component detector 206, a real-zero sequence generator 207, a signal reconstruction unit 408, a demodulator 209 and a decoder 210, and is connected to an antenna unit 201. Receiver apparatus 400 is different from receiver apparatus 200 in that signal reconstruction unit 408 is provided instead of signal reconstruction unit 208. Description hereinbelow will be given focusing on the different component.

Receiver apparatus 400 receives based on expression (30), and the real-zero signal added with a sinusoidal wave at real-zero signal generator 205 (reference signal adder) is given by the following expression (31).

[Math 31]

$$r_z(t) = \sum_{k=-(M+1)}^{M+1} c_k(t) e^{j2\pi f_k t} \tag{31}$$

$$c_{M+1} = c_{-(M+1)} = A_u/2$$

Further, expression (31) can be written as expression (32).

[Math 32]

$$r_z(Z) = \sum_{k=-(M+1)}^{M+1} c_k Z^k \tag{32}$$

$$Z = e^{j2\pi \Delta f t}$$

Here, Δf is the frequency interval between subcarriers.

In-phase and quadrature component detector 206 extracts the in-phase component (real number component, I-component) and quadrature component (imaginary number component, Q-component) from expression (31), and real-zero sequence generator 207 calculates time points (zero-cross sequences) at which the in-phase component and quadrature component become zero.

Signal reconstruction unit 408 reconstructs each subcarrier component of the OFDM modulated signal, from in-phase component zero-cross sequence τi and quadrature component zero-cross sequence τq. Signal reconstruction unit 208 further extracts in-phase component ik and quadrature component qk from in-phase component zero-cross sequence τi and quadrature component zero-cross sequence τq and outputs the resultant to demodulator 209.

When in-phase component i^z(t) and quadrature component q^z(t) of the real-zero signal are reproduced from in-phase component zero-cross sequence τi and quadrature component zero-cross sequence τq, these can be given as expressions (33) and (34).

[Math 33]

$$\hat{i}_z(Z) = C_{M+1} Z^{-(M+1)} \prod_{m_i=1}^{2(M+1)} \left( Z - e^{j2\pi \Delta f t_{i,m_i}} \right) \quad (33)$$

[Math 34]

$$\hat{i}_q(Z) = C_{M+1} Z^{-(M+1)} \prod_{m_q=1}^{2(M+1)} \left( Z - e^{j2\pi \Delta f t_{i,m_q}} \right) \quad (34)$$

Expressions (33) and (34) are subjected to FFT processing so that in-phase component ik and quadrature component qk of each subcarrier are extracted.

Further, in another method of extracting in-phase component ik and quadrature component qk from in-phase component zero-cross sequence τi and quadrature component zero-cross sequence τq, the Fourier coefficients that satisfy the Fourier series of the real-zero signal are calculated from in-phase component zero-cross sequence τi and quadrature component zero-cross sequence τq input from real-zero sequence generator 207 so as to extract Ck of in-phase component ik and quadrature component qk of the transmission signal.

As a method of calculating Fourier coefficients from a real-zero sequence, for example a lookup table of Fourier coefficients for the real-zero sequence is prepared, and the real-zero sequence input from real-zero sequence generator 207 are compared with the lookup table to thereby calculate the Fourier coefficients. As another method, it is possible to calculate the Fourier coefficients from the real zero sequence by using a recursive algorithm based on the Newton's formulas.

As described above, according to the communication system of the fourth embodiment, when receiving a quadrature-modulated signal that was transmitted by OFDM scheme, the receiver apparatus generates a real-zero signal by adding a sinusoidal wave to the received signal, performs frequency conversion and in-phase and quadrature phase detection using the generated real-zero signal, then performs time-digital conversion to thereby extract each subcarrier component of the OFDM modulated signal to reproduce the in-phase component and phase component. As a result, it is possible to suppress degradation of data decoding accuracy even when linearity cannot be maintained and waveform distortion occurs in the analog circuit of the receiver apparatus that receives the OFDM modulated signal. Further, in the communication system of the present embodiment, it is possible to operate the analog circuit with low voltage, hence power consumption can be suppressed to a low level.

As the embodiment of this invention has been detailed with reference to the drawings, the specific configuration should not be limited to this embodiment. Designs and others that do not depart from the gist of this invention should also be included in the scope of claims.

Though the above-described embodiment was described taking a case where OFDM is used as the multi-carrier transmission scheme, the invention should not be limited to this but can also be applied to DFT-Spread-OFDM, MC-CDMA (Multi Carrier-Code Division Multiple Access) and the like.

Description of Reference Numerals 100 transmitter apparatus
  101 antenna unit
  102 coder
  103 constellation mapping unit
  104 DA converter
  105 quadrature modulator
  106 band-pass filter unit
  107 frequency converter
  108 power amplifier
  109 first local signal generator
  110 second local signal generator
200 receiver apparatus
  201 antenna unit
  202 low-noise amplifier
  203 band-pass filter unit
  204 gain control amplifier
  205 real-zero signal generator
  206 in-phase and quadrature component detector
  207 real-zero sequence generator
  208 signal reconstruction unit
  209 demodulator
  210 decoder

The invention claimed is:

1. A receiver apparatus receiving a quadrature-modulated, modulated wave, comprising:
a real-zero signal generator for adding a sinusoidal wave to the modulated wave to generate a real-zero signal;
an in-phase and quadrature component detector for extracting an in-phase component signal and a quadrature component signal from the real-zero signal;
a real-zero sequence generator for generating a real-zero sequence as a sequence of time points at which the in-phase component and quadrature component signals become zero; and
a signal reconstruction unit for reproducing the in-phase component and quadrature component from the real-zero sequence.

2. The receiver apparatus according to claim 1, wherein the real-zero signal generator includes a time digital converter for measuring time points at which the in-phase component and quadrature component signals become zero.

3. The receiver apparatus according to claim 1, wherein the in-phase and quadrature component detector includes an amplifier for limiter-amplifying the real-zero signal.

4. The receiver apparatus according to claim 1, wherein the in-phase and quadrature component detector includes an amplifier for limiter-amplifying the in-phase component signal and quadrature component signal extracted from the real-zero signal.

5. The receiver apparatus according to claim 1, further includes a signal strength detector for detecting the signal strength of the real-zero signal, wherein the in-phase and quadrature component detector includes a signal correction unit for correcting in-phase component and quadrature component signals based on the signal strength.

6. The receiver apparatus according to claim 1, wherein a multi-carrier signal that has multi-carrier-modulated the modulated wave is received and the signal reconstruction unit reconstructs each subcarrier signal of the multi-carrier signal.

7. A communication system comprising a transmitter apparatus transmitting a quadrature-modulated, modulated wave and a receiver apparatus receiving a modulated wave transmitted from the transmitter apparatus, characterized in that the receiver apparatus includes:

an in-phase and quadrature component detector for extracting an in-phase component signal and a quadrature component signal from a real-zero signal of the modulated wave to which a sinusoidal wave has been added;

a real-zero sequence generator for generating a real-zero sequence as a sequence of time points at which the in-phase component and quadrature component signals become zero; and a signal reconstruction unit for reproducing the in-phase component and quadrature component from the real-zero sequence.

8. The communication system according to claim 7, wherein the receiver apparatus further includes a real-zero signal generator for adding a sinusoidal wave to the modulated wave to generate a real-zero signal.

9. The communication system according to claim 7, wherein the transmitting apparatus further includes a reference signal adder for adding a sinusoidal wave to the modulated wave and the receiver apparatus further includes a real-zero signal generator for generating a real-zero signal based on the sinusoidal wave.

10. A reception method for receiving a quadrature-modulated, modulated wave, comprising:

a real-zero signal generating step of adding a sinusoidal wave to the modulated wave to generate a real-zero signal;

an in-phase/quadrature component detecting step of extracting an in-phase component signal and a quadrature component signal from the real-zero signal;

a real-zero sequence generating step of generating a real-zero sequence as a sequence of time points at which the in-phase component and quadrature component signals become zero; and a signal reconstructing step of reproducing the in-phase component and quadrature component from the real-zero sequence.

11. A communication method comprising a transmitting process of transmitting a quadrature-modulated, modulated wave and a receiving process of receiving a modulated wave transmitted from a transmitter apparatus, characterized in that the receiving process includes:

a real-zero signal generating step of adding a sinusoidal wave to the modulated wave to generate a real-zero signal;

an in-phase/quadrature component detecting step of extracting an in-phase component signal and a quadrature component signal from the real-zero signal;

a real-zero sequence generating step of generating a real-zero sequence as a sequence of time points at which the in-phase component and quadrature component signals become zero; and a signal reconstructing step of reproducing the in-phase component and quadrature component from the real-zero sequence.

* * * * *